US012305265B2

(12) United States Patent
Zhu et al.

(10) Patent No.: US 12,305,265 B2
(45) Date of Patent: May 20, 2025

(54) FINE GRAIN RARE EARTH ALLOY CAST STRIP, PREPARATION METHOD THEREOF, AND A ROTARY COOLING ROLL DEVICE

(71) Applicant: BEIJING ZHONG KE SAN HUAN HI-TECH CO., LTD., Beijing (CN)

(72) Inventors: Wei Zhu, Beijing (CN); E Niu, Beijing (CN); Zhian Chen, Beijing (CN); Xuanzhang Ye, Beijing (CN); Fei Du, Beijing (CN); Zhan Wang, Beijing (CN); Xiaolei Rao, Beijing (CN); Boping Hu, Beijing (CN)

(73) Assignee: BEIJING ZHONG KE SAN HUAN HI-TECH CO., LTD., Beijing (CN)

( * ) Notice: Subject to any disclaimer, the term of this patent is extended or adjusted under 35 U.S.C. 154(b) by 603 days.

(21) Appl. No.: 17/733,879

(22) Filed: Apr. 29, 2022

(65) Prior Publication Data

US 2022/0251692 A1 Aug. 11, 2022

Related U.S. Application Data

(63) Continuation of application No. 16/455,653, filed on Jun. 27, 2019, now abandoned, which is a continuation of application No. PCT/CN2017/111025, filed on Nov. 15, 2017.

(30) Foreign Application Priority Data

Dec. 29, 2016 (CN) ......................... 201611244386.6
Dec. 29, 2016 (CN) ......................... 201611244721.2
Dec. 29, 2016 (CN) ......................... 201611245318.1

(51) Int. Cl.

| | |
|---|---|
| ***H01F 1/053*** | (2006.01) |
| ***B22D 11/06*** | (2006.01) |
| ***C22C 38/00*** | (2006.01) |
| ***C22C 38/32*** | (2006.01) |
| *B22D 11/00* | (2006.01) |
| *B22D 11/124* | (2006.01) |
| *B22D 11/128* | (2006.01) |
| *B22D 11/14* | (2006.01) |

(52) U.S. Cl.

CPC ............ *C22C 38/005* (2013.01); *B22D 11/06* (2013.01); *C22C 38/00* (2013.01); *C22C 38/32* (2013.01); *H01F 1/053* (2013.01); *B22D 11/001* (2013.01); *B22D 11/068* (2013.01); *B22D 11/124* (2013.01); *B22D 11/1287* (2013.01); *B22D 11/144* (2013.01)

(58) Field of Classification Search

CPC ....................................................... H01F 1/053

See application file for complete search history.

(56) References Cited

U.S. PATENT DOCUMENTS

| | | | | |
|---|---|---|---|---|
| 4,408,653 | A | 10/1983 | Nienart et al. | |
| 4,489,773 | A | 12/1984 | Miller | |
| 4,865,657 | A | 9/1989 | Das et al. | |
| 10,115,506 | B2 | 10/2018 | Hu et al. | |
| 10,714,245 | B2 | 7/2020 | Chen et al. | |
| 2006/0076085 | A1 | 4/2006 | Chen et al. | |
| 2014/0247100 | A1 * | 9/2014 | Tsubokura | C22C 38/005 419/33 |

FOREIGN PATENT DOCUMENTS

| | | | | |
|---|---|---|---|---|
| CN | 1442253 | A | | 9/2003 |
| CN | 1552543 | A | | 12/2004 |
| CN | 1705537 | A | | 12/2005 |
| CN | 1860248 | A | | 11/2006 |
| CN | 101629264 | A | | 1/2010 |
| CN | 102107277 | A | | 6/2011 |
| CN | 102468027 | A | | 5/2012 |
| CN | 102693799 | A | | 9/2012 |
| CN | 102699294 | A | | 10/2012 |
| CN | 103875045 | A | | 6/2014 |
| CN | 103890867 | A | | 6/2014 |
| CN | 105033204 | A | * | 11/2015 |
| CN | 105118597 | A | | 12/2015 |
| CN | 105121682 | A | | 12/2015 |
| CN | 105845301 | A | | 8/2016 |
| EP | 2942790 | A1 | | 11/2015 |

(Continued)

OTHER PUBLICATIONS

English machine translation of CN 105033204 A of Nagata (Year: 2015).*

The State Intellectual Property Office of People's Republic of China the First Office Action for Application CN 201611244386.6 Dec. 23, 2020 8 pages (with translation).

The State Intellectual Property Office of People's Republic of China the First Search for Application CN 201611244386.6 Dec. 15, 2020 2 pages.

The State Intellectual Property Office of People's Republic of China the First Office Action for Application CN 201611244721.2 Sep. 2, 2020 7 pages(with translation).

(Continued)

*Primary Examiner* — Jophy S. Koshy

(74) *Attorney, Agent, or Firm* — ANOVA LAW GROUP, PLLC

(57) ABSTRACT

An alloy cast strip preparation method includes a melting process and a casting cooling process. The melting process includes controlling a power of an induction melting furnace to perform a cyclic heat treatment to completely melt an alloy raw material before a surface temperature of a melt obtained by melting the alloy raw material is raised to 1300° C., and, after the alloy raw material is melted, adjusting the power of the induction melting furnace to stabilize the surface temperature of the melt at a temperature in a range from 1400° C. to 1500° C. The casting cooling process includes performing casting cooling on the melt arranged on a surface of a rotary cooling roll to obtain an alloy cast strip while controlling a surface linear velocity of the rotary cooling roll to be from 1.5 m/s to 2.25 m/s.

3 Claims, 16 Drawing Sheets

(56) References Cited

FOREIGN PATENT DOCUMENTS

| | | | |
|---|---|---|---|
| JP | S6238743 | A | 2/1987 |
| JP | H01127147 | A | 5/1989 |
| JP | H02299748 | A | 12/1990 |
| JP | H05205914 | A | 8/1993 |
| JP | H08269643 | A | 10/1996 |
| JP | H09155508 | A | 6/1997 |
| JP | H09225595 | A | 9/1997 |
| JP | H09225613 | A | 9/1997 |
| JP | 2001059144 | A | 3/2001 |
| JP | 2002208509 | A | 7/2002 |
| JP | 2003089825 | A | 3/2003 |
| JP | 2004050193 | A | 2/2004 |
| JP | 2006245300 | A | 9/2006 |
| JP | 2008121044 | A | 5/2008 |
| JP | 2008231535 | A | 10/2008 |
| JP | 4217865 | B2 | 2/2009 |
| JP | 2009114543 | A | 5/2009 |
| JP | 2009534539 | A | 9/2009 |
| JP | 2010099683 | A | 5/2010 |
| JP | 2013094811 | A | 5/2013 |
| KR | 100535946 | B1 | 12/2005 |
| WO | 2004030000 | A1 | 4/2004 |
| WO | 2005098878 | A2 | 10/2005 |
| WO | 2005098878 | A3 | 2/2006 |
| WO | 2012002531 | A1 | 1/2012 |
| WO | 2013054847 | A1 | 4/2013 |

OTHER PUBLICATIONS

The State Intellectual Property Office of People's Republic of China the First Search for Application CN 201611244721.2 Aug. 26, 2020 1 page.
The State Intellectual Property Office of People's Republic of China the First Office Action for Application CN 201611245318.1 Aug. 3, 2020 8 pages (with translation).
The State Intellectual Property Office of People's Republic of China the First Search for Application CN 201611245318.1 Jun. 17, 2020 2 pages.
The State Intellectual Property Office of People's Republic of China the Second Office Action for Application CN 201611245318.1 Mar. 1, 2021 9 pages (with translation).
The State Intellectual Property Office of People's Republic of China the Supplementary Search for Application CN 201611245318.1 Jun. 2, 2021 1 page.
Japan Patent Office the Decision to Grant a Patent for Japanese Patent Application No. 2019535271 Mar. 2, 2021 6 pages.
World Intellectual Property Organization (WIPO) International Search Report for PCT/CN2017/111025 Feb. 7, 2018 8 pages.

* cited by examiner (a) (b) (c) (d)

FINE GRAIN RARE EARTH ALLOY CAST STRIP, PREPARATION METHOD THEREOF, AND A ROTARY COOLING ROLL DEVICE

CROSS-REFERENCE TO RELATED APPLICATIONS

This application is a continuation of application Ser. No. 16/455,653, filed Jun. 27, 2019, which is a continuation of International Application No. PCT/CN2017/111025, filed Nov. 15, 2017, which claims priority to Chinese Application Nos. 201611244386.6, 201611244721.2, and 201611245318.1, all filed Dec. 29, 2016, the entire contents of all of which are incorporated herein by reference.

TECHNICAL FIELD

The present disclosure relates to rare earth alloy cast strip and its preparation method, specifically relates to alloy cast strip for fine grain rare earth sintered magnets, its preparation method and a rotary cooling roll device.

BACKGROUND

The trend of industrial automation and the expansion of the demand for clean energy represented by electric vehicles have provided new market opportunities for rare earth permanent magnets, but at the same time they have increased the requirements for magnet performance. For example, Nd—Fe—B magnets for electric vehicles generally need to contain at least 5 to 6% by mass of a heavy rare earth element such as Dy to improve the high temperature resistance of the magnet. However, due to the risk management of heavy rare earth elements such as Dy and the continuous pursuit of higher performance of magnets, reducing the amount of heavy rare earth has become an important issue for Nd—Fe—B magnet technology while improving or maintaining the existing performance indicators.

Recent trends in Nd—Fe—B magnet technology show that there are two main routes for reducing the amount of heavy rare earth and further increasing the coercivity of the magnet to improve its thermal stability: 1 heavy rare earth (such as Dy, Tb, etc.) element boundary diffusion technology (GBD); 2 magnet grain refinement technology. The grain boundary diffusion technique (GBD) has enabled the magnet to reduce the heavy rare earth content of about 2 to 3% by mass while maintaining or slightly improving the existing performance. It is expected that the coercive force can be remarkably improved by further refining to an average particle diameter of no more than 3 μm on the basis of the existing average magnet grain size of about 6 to 10 μm. On the basis of the existing mass production technology, the amount of heavy rare earth elements in the mass ratio of 1 to 2% can be further reduced, and it is expected that the rare earth permanent magnets having low or heavy rare earth elements and satisfying the performance requirements of electric vehicles can be finally obtained. Therefore, the grain refinement technology has important practical application value for various types of rare earth permanent magnets represented by Nd—Fe—B.

As the first process of industrial production of modern Nd—Fe—B magnets, the preparation of alloy strips has laid a foundation for the entire manufacturing process of magnets. The quality of alloy strips has a critical impact on the performance of the final magnets.

It has been reported in literature that spacing of Nd-rich phases of strip casting flakes is even and uniform which is of positive significance for the current mass production of magnets. However, the microstructure of the prepared strips is essentially a columnar crystal with the particle on surface of the cooling roll as a heterogeneous nucleation center and radially growing along the temperature gradient direction, and the improvement is mainly to reduce spacing of rare-earth-rich phases of the columnar grains distributed along the temperature gradient direction. The spacing of plate crystal rare-earth-rich phases on free surface side is usually larger than that on the surface side of the roll, and the overall spacing deviation is greater than 3 μm. It is not conducive to the uniformity of powder during its preparation. At the same time, the spacing of rare-earth-rich phase of such alloy cast strips is too large, which is not conducive to grain refinement. When the powder with a particle size of about 3~5 μm is prepared, the rare-earth-rich phase loss is large. With the demand for grain refinement, the particle size of the jet mill powder is further reduced, and the effective utilization rate of the rare earth is further reduced, which is not conducive to improving the coercive force of the final magnet. At the same time, the growth mode along the direction of the temperature gradient easily leads to macroscopic segregation of the alloy composition in this direction, which may increase the unevenness of the microscopic magnetocrystalline anisotropy in the local region of the final magnet and reduce the coercive force of the magnet.

SUMMARY OF THE DISCLOSURE

In view of the above problems, the present disclosure provides a fine grain rare earth alloy cast strip, a preparation method thereof, and a rotary cooling roll device used in the preparation process. The inner grains of the alloy cast strip prepared according to the present disclosure are fine and uniform, and the spacing of the rare-earth-rich phases is small. When the sintered rare earth magnet is prepared by using the alloy cast strip, the utilization ratio of the rare earth and the uniformity of the powder can be improved, and the coercive force of the final magnet can be improved.

One purpose of this disclosure is to provide an alloy cast strip for a fine-grain rare earth sintered magnet having a roll surface and a free surface, characterized in that the alloy cast strip comprises grains with $R_2Fe_{14}B$-type compound as their main phase, and the grains include non-columnar grains and columnar grains along a temperature gradient cross section. In some embodiments, non-columnar grains having an aspect ratio of 0.3 to 2 account for ≥60% of the area of the grains and account for ≥75% of the number of grains; and columnar grains with an aspect ratio ≥3 account for ≤15% of the area of the grains and account for ≤10% of the number of grains.

In another aspect, this disclosure provides an alloy cast strip comprising $R_2Fe_{14}B$-type main phase, in-grain rare-earth-rich phase embedded in a grain and boundary rare-earth-rich phase distributed on the boundary of the grains, wherein the spacing of the in-grain rare-earth-rich phases is 0.5-3.5 μm.

Furthermore, the alloy cast strip comprises a rare earth element R, an additive element T, iron Fe and boron B; wherein the R is one or more of La, Ce, Pr, Nd, Sm, Tb, Dy, Ho, Sc, Y; the T is one or more of Co, Ni, Cu, Mn, Cr, Ga, V, Ti, Al, Zr, Nb, Sn.

In some embodiments of the present disclosure, the mass ratio of B in the alloy cast strip is from 0.85% to 1.1%.

Furthermore, the equivalent circle diameter of the grains is 2.5 to 65 μm in a section along a temperature gradient direction.

Furthermore, the crystal grains having an equivalent circle diameter of 10 to 50 μm account for ≥80% of the area of the crystal grains. The crystal grains having an equivalent circle diameter of 15 to 45 μm account for ≥50% of the number of the crystal grains.

Furthermore, in the cross section of the temperature gradient direction, the average equivalent circle diameter of the grains in the range of 100 μm near the roll surface is 6 to 25 μm; the average equivalent circle diameter of the grains in the range of 100 μm near the free surface is 35 to 65 μm.

Furthermore, the area of grains having a heterogeneous nucleation center occupies ≤5% of the area of the alloy cast strip.

Furthermore, the grains are not in a through-grown state from the roll surface to the free surface.

Furthermore, the rare-earth-rich phase is not in a through-grown state from the roll surface to the free surface.

Furthermore, the grain boundaries have a rare-earth-rich phase distributed in an irregularly closed configuration along a temperature gradient direction cross section.

In some embodiments of this disclosure, the grain has a primary crystal axis and a secondary crystal axis; wherein the secondary crystal axis grows based on the primary crystal axis. The width L1 of the primary crystal axis at the minor axis direction is 1.5 to 3.5 μm; the width L2 of the secondary crystal axis at the minor axis direction is 0.5 to 2 μm.

Furthermore, the rare-earth-rich phase between the secondary crystal axes is distributed in a short straight line or a discontinuous dotted line.

The disclosure also provides a method for preparing the above alloy cast strip for fine grain rare earth sintered magnet, comprising the following steps:

The rust-removed alloy raw material is placed in a crucible, and the crucible is placed in the induction melting furnace; the impurity gas adsorbed by the alloy raw material is excluded; the power of the induction melting furnace is controlled, and the alloy raw material is completely melted by the cyclic heat treatment before the surface temperature of the melt is raised to 1300° C.; after the alloy raw material is melted, the power of the induction melting furnace is adjusted to stabilize the surface temperature of the melt at any temperature in the range of 1400° C. to 1500° C.; and the surface linear velocity of the rotary cooling roll device is controlled to be 1.5 to 2.25 m/s, and the melt is uniformly and smoothly arranged on the surface of the rotary cooling roll device for casting cooling to obtain an alloy cast strip.

In some embodiments of this disclosure, a metal having a higher melting point in the alloy raw material is placed at the bottom of the crucible, and a metal having a lower melting point is placed on the upper portion of the crucible.

In some embodiments of this disclosure, in the induction melting furnace, the impurity gas adsorbed by the alloy raw material is removed by vacuuming-filling with an argon gas; the argon gas is high purity argon with its volume fraction ≥99.99%.

In some embodiments of this disclosure, the ten point average roughness of the rotary cooling roll device surface ranges from 1 to 10 μm.

In some embodiments of this disclosure, in the casting cooling process, the ratio of the casting speed q of the melt to the cooling water flow rate Q in the rotary cooling roll device is q/Q=0.05 to 0.1.

In some embodiments of this disclosure, during casting cooling, the difference between average temperature of alloy cast strip on the highest point of rotary cooling roll and melting point of alloy main phase ranges from 300~450° C.

This disclosure also provides a rotary cooling roll device for use in the above mentioned method, comprising an inlet pipe, a water inlet sleeve, an outlet pipe, a water outlet sleeve, an internal heat exchange passage, a rotary cooling roll outer casing, wherein the inner heat exchange flow passage is nested inside the rotary cooling roll device, the rotary cooling roll outer casing is an inner spiral structure prepared from a copper-chromium alloy, and forms a spiral water channel with the inner heat exchange flow passage; the rotary cooling a front end cover and a rear end cover are fixed on both sides of the roll outer casing, the front end cover is provided with a water inlet hole; the inner heat exchange flow path is a hollow structure, and a heat conducting sheet perpendicular to the front end cover is embedded; on the internal heat exchange, a water inlet hole is disposed on a side of the front end cover, and a water outlet hole is disposed on a side of the front end cover; the water inlet pipe and the water outlet pipe are disposed on the rotary joint, and both ends of the water inlet sleeve are connected to the rotary joint and the water inlet hole of the inner heat exchange passage respectively, the two ends of the water outlet sleeve are respectively connected with the water inlet of the rotary joint and the front end cover, and the inner diameter of the water outlet sleeve is larger than the inlet water sleeve outer diameter.

Furthermore, the number of the heat conducting sheets is plural.

Furthermore, the water outlet sleeve is fixedly connected to the front end cover through a sealing sleeve. On the inner heat exchange flow passages, one or more water outlet holes are disposed adjacent to the rear end cover side.

The alloy cast strip prepared by the method of the disclosure has a grain aspect ratio in the range of 0.3 to 4 in the alloy cast strip along the temperature gradient direction section, and the equivalent circle diameter of the crystal grain is in the range of 2.5-65 μm. The spacing of in-grain rare-earth-rich phases is in the range of 0.5 to 3.5 μm. The distribution of the rare-earth-rich phase is less affected by the temperature gradient, the distribution is more uniform, and the difference between the roll surface side and the free surface side is smaller. For magnet prepared by the alloy cast strip which is chemically crushed and mechanically crushed, the obtained powder has a more uniform particle size and higher rare-earth-rich phase adhesion rate. The growth mode of the grains in the alloy cast strip is different from the radial growth in the conventional technologies (that is, growth along the temperature gradient), which is advantageous for suppressing the macrosegregation of the composition of the alloy cast strip and improving the coercive force of the final magnet product.

In the rotary cooling roll device of the present disclosure, a spiral water passage can be formed between the inner heat exchange passage and the rotary cooling roll outer casing. Moreover, the radial heat-conducting sheet embedded in the inner heat exchange flow channel can increase the contact area of the cooling water and the solid heat-dissipating component, improve the heat exchange capability, and thereby improve the overall cooling capacity of the device.

BRIEF DESCRIPTION OF THE DRAWINGS

FIG. 14b is an enlarged photograph (4000× magnification) of a partial area in the lower middle of FIG. 14a.

DETAILED DESCRIPTION OF THE EMBODIMENTS

The embodiments of the present disclosure will be described in more detail in conjunction with the accompanying drawings and examples in order to provide a better understanding of the embodiments of the disclosure and its advantages. However, the specific embodiments and examples described below are illustrative only rather than limiting the disclosure.

Figure 8:
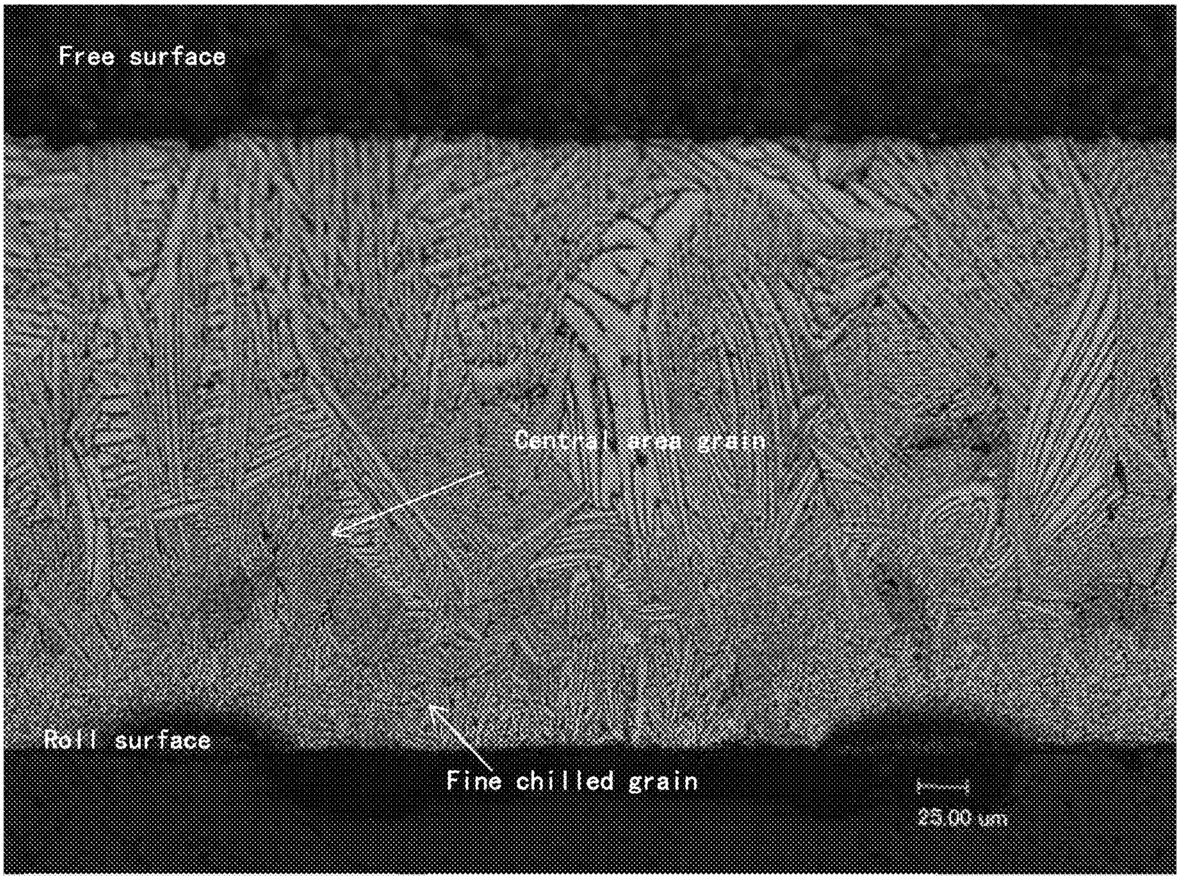
FIG. 8 is an optical micrograph (600-time magnification) of a Nd—Fe—B alloy cast strip having a layered structure.

As shown in FIG. 8, part of the Nd—Fe—B alloy cast strip can show a distinct layered structure during a preparation process.

In FIG. 8, the lower part is the roll surface, and a thin layer of fine chilled crystal appears. The upper part is a free surface, and the Nd-rich phase has a clear growth trend along the temperature gradient direction, but the grain boundary is difficult to distinguish by the ordinary light microscope and scanning electron microscope. The grain boundaries in the central region are clearly visible, and the inner Nd-rich phase is smaller and the spacing is smaller than that in the upper free surface region. Among them, some of the grain Nd-rich phase distribution traces are inconsistent with the temperature gradient direction, even perpendicular to the temperature gradient direction.

Figure 6:
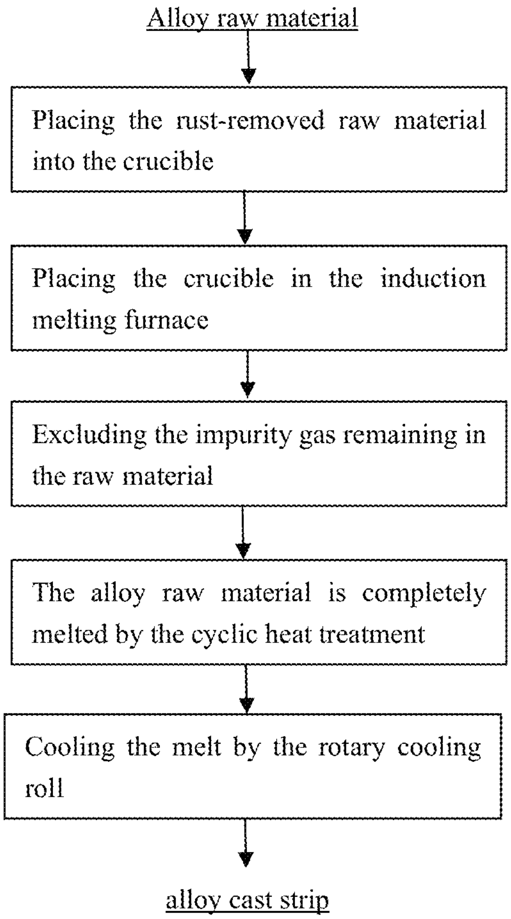
FIG. 6 is a schematic flow chart of a method for preparing an alloy cast strip according to an embodiment of the present disclosure.

The melt solidification process in the middle region is different from the roll surface and the free surface, and may be a special transition state between the two. The present disclosure aims to promote the formation of the intermediate layer, and at the same time suppress the ratio of chilled crystal on the roll surface and gradient growth layer on the free surface, and prepare an alloy cast strip for the fine grain rare earth sintered magnet. The preparation method is shown in FIG. 6.

The preparation process of the alloy cast strip mainly includes the steps of alloy melting and casting cooling:

(A) Alloy Melting

For this step, attention needs to be paid to the following two points.

(1) The impurity gas adsorbed by the raw material is sufficiently excluded.

In an embodiment of the disclosure, an alloy is smelted using an induction melting furnace. First, the alloy raw material is subjected to rust removal treatment, and the raw material is placed in a crucible according to the formulation of the alloy cast strip, and the crucible is placed in an induction melting furnace. In the present disclosure, the Fe having the largest proportion of the alloy and having a higher melting point is usually placed at the bottom of the crucible, and the rare earth and rare earth alloy having a relatively low melting point are placed on the upper portion of the crucible.

Close the induction melting furnace lid and evacuate to $10^{-2}$~$10^{-3}$ Pa. The vacuum is continued under low power and slow heating. After low-power heating for 3 to 5 minutes, the power is appropriately increased, and the operation is repeated until the internal material of the crucible emits a red luster due to an increase in temperature. Then, the vacuum valve is closed to charge the induction melting furnace with high-purity (≥99.99%) argon gas until the gas pressure in the furnace reaches 40-50 kPa for 0.5 to 1 minute. Reopen vacuum valve to vacuum to $10^{-2}$ Pa and charged with argon to 40 kPa again. In this stage, the heating power, heating time and temperature of the raw materials in the crucible can be adjusted according to the actual working conditions, without strict requirements, and can be repeated many times. The purpose of this operation is to completely exclude the impurity gases adsorbed by the raw materials, especially oxygen.

(2). Carry out low temperature cyclic overheat treatment, high power temperature refining, purification of the melt.

After the impurity gas is sufficiently removed, the power of the induction melting furnace is gradually increased until the alloy begins to melt, thereby forming a melt. The melt surface temperature measured using a dual colorimetric infrared thermometer is within a range of 1050° C.-1200° C., but high-melting raw materials such as metallic iron are not completely melted. Adopt high power and low power oscillation control, and perform cyclic heat treatment under protective atmosphere to make the melt fluctuate warm up in small temperature (50~100)° C. range. Ensure that the alloy raw materials are completely melted before warming up to 1300° C.

The cyclic overheat treatment process in the present disclosure is as follows: for example, the alloy melt may begin to melt at 1150° C., but high melting point metals such as iron are not completely melted and still exist as bulk metals. Keep heating power constant or increase heating power to raise the melt temperature to 1200° C. After 30 to 60 seconds, reduce the heating power or stop the heating to lower the melt temperature to 1100° C. and remain at this temperature for 30 to 60 seconds. Then increase the heating power to raise the melt temperature to 1250° C. and remain for 30 to 60 seconds, then reduce the heating power again and wait for the melt temperature to drop back to 1200° C. Then increase the heating power again and wait for the melt temperature to rise to 1300° C. And keep it for 30 to 60 seconds. During the cyclic overheat treatment process, the bulk metal iron gradually melts and disappears, but the internal composition of the melt fluctuates greatly, and at the same time, with the melting or precipitation of γ-Fe and other unknown alloy particles, the inherent heterogeneous nucleation center melt can be reduced or passivated to some extent, which is conducive to purify melt and reduce the heterogeneous nucleation rate during melt solidification.

After the alloy raw material is melted to obtain a melt, the power of the induction melting furnace is increased, and the stirring effect of the induced electromagnetic wave on the melt is enhanced. When the melt surface temperature rises to 1400° C., the temperature increasing rate is reduced by adjusting the power, and the final melt temperature is stabilized at a temperature in the range of 1400° C.~1500° C. ("stable" refers to a temperature fluctuation≤30° C. within one minute). During this operation, the oxide in the melt mostly adheres to the crucible wall as a dross, and a small amount floats on the surface of the melt without affecting the progress of the casting process. At this point, the melt reaches the casting state.

The purpose of this step is to optimize the melt state, purify the melt, and to make the internal temperature of the melt uniform, and to withstand greater subcooling in the subsequent casting cooling step with the necessary conditions for thermodynamic deep subcooling. Controlling the melt temperature to be not lower than 1400° C. can reduce the number of large atomic groups in the melt, thereby reducing the size of interior critical nucleus of the melt during the non-equilibrium solidification. At the same time, during deep subcooling, it is beneficial to reduce the activation energy in the process of melt nucleation and increase the probability of homogeneous nucleation. In summary, due to the lack of a sufficient nucleation center in purified interior of the melt, the nucleation rate of the melt on the surface side of the roll is suppressed, and thereby the formation of the chilled crystal region is suppressed. At the same time, it is beneficial to the super deep cooling of the melt, which increases the probability of homogeneous nucleation in the melt.

(B) Casting Cooling

The casting cooling process may include: quasi-static heat exchange between the melt and the cooling roll; and unbalanced rapid transport of the heat of the cooling roll by the water body. The heat transfer coefficients of copper and water are 401 W/(m·K) and 0.5 W/(m·K), respectively. In order to remove the heat from the surface of the chill roll in time, the casting flow rate and the cooling water flow rate need to be matched. Moreover, the water channel design of the chill roll is also critical because the heat exchange efficiency of the cooling roll outer casing and the water body directly affects the cooling capacity of the equipment.

Figure 7A:
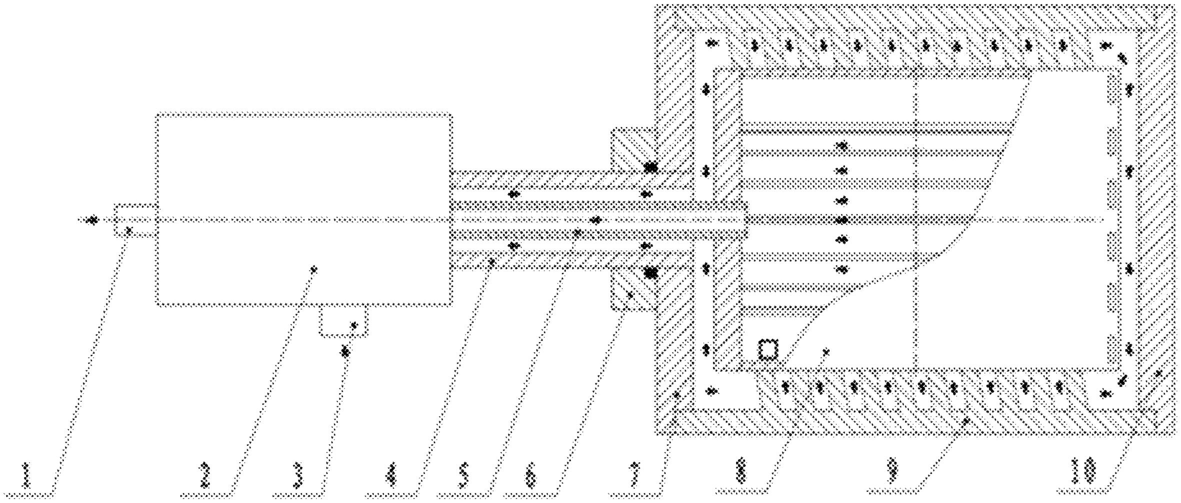
FIG. 7a is a schematic structural view of a rotary cooling roll device in accordance with an embodiment of the present disclosure.
Figure 7B:
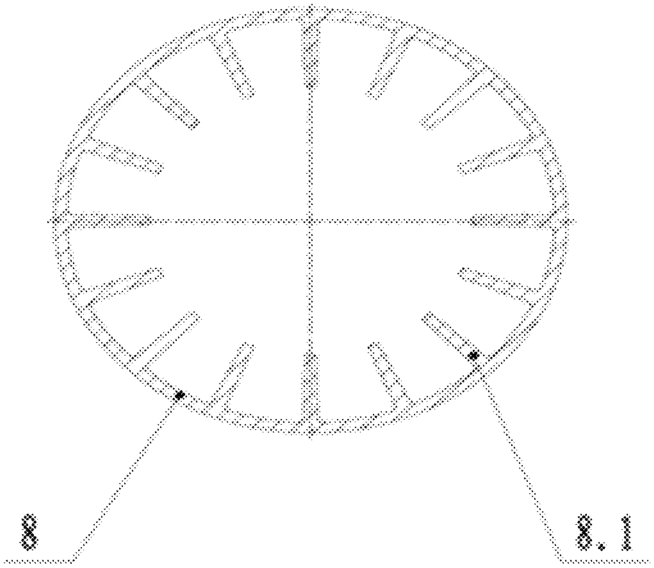
FIG. 7b is an axial cross-sectional view of the inner wall of the inner heat exchange passage in the rotary cooling roll device.

FIGS. 7*a* and 7*b* show a rotary cooling roll device according to an embodiment of the present disclosure. As shown in FIG. 7*a*, the rotary cooling roll device comprises: an inlet pipe 1, a rotary joint 2, an outlet pipe 3, a water outlet sleeve 4, a water inlet sleeve 5, a sealing sleeve 6, a front end casing 7, an internal heat exchange passage 8, and a heat conducting sheet 8.1, a cooling roll outer casing 9 and the rear end cover 10. Among them, the rotary joint 2 can realize the relative rotation isolation between the inlet pipe 1, the outlet pipe 3 and the rotary cooling roller.

The rotary cooling roll outer casing 9 includes an inner spiral structure prepared from a copper-chromium alloy and having an inner diameter larger than the outer diameter of the inner heat exchange passage 8, and the inner heat exchange passage 8 is embedded in the rotary cooling roll outer casing 9 to form a spiral water passage. Both the inner heat exchange passage 8 and the rotary cooling roll outer casing 9 include a hollow structure. The front end cover 7 and the rear end cover 10 are respectively fixed to both sides of the rotary cooling roll outer casing 9 and are perpendicular to the heat conducting sheet 8.1. Further, a water inlet hole is provided in the front end cover 7. On the inner heat exchange passage 8, a water outlet hole is provided on the side close to the rear end cover 10, and a water inlet hole is provided on the side close to the front end cover 7. The inlet pipe 1 and the outlet pipe 3 are provided on the rotary joint 2. Both ends of the water inlet sleeve 5 are respectively connected to the water inlet hole of rotary joint 2 and the water inlet hole of the inner heat exchange flow passage 8. Both ends of the water outlet sleeve 4 are respectively connected to the water inlet holes of rotary joint 2 and the water inlet holes of the front end cover 7. The inner diameter of the water outlet sleeve 4 is larger than the outer diameter of the water inlet sleeve 5. The water outlet sleeve 4 and the front end cover 7 are connected and fixed by a sealing sleeve 6.

The device of the present disclosure operates in such a manner that cooling water enters the inner heat exchange passage 8 from the inlet pipe 1 via the rotary joint 2 and the water inlet sleeve 5, leaving a plurality of small holes near one end of the rear end cover 10. After the high-pressure water jet is ejected from the small holes, it flows back along the spiral water passage to the front end cover 7, and flows out of the water outlet pipe 3 through the water outlet sleeve 4 and the rotary joint 2.

When the casting is cooled, the rotating cooling roll outer casing 9 is in direct contact with the high temperature melt to absorb its heat. The inner spiral structure can increase the mass of the rotating cooling roll outer casing 9, increase the overall heat capacity, and is beneficial to increase the absorption of the melt heat by the rotating cooling roll. Further, the contact area of the rotary cooling roll outer casing 9 with the water body is increased, thereby increasing the heat exchange coefficient between the rotary cooling roll and the water body. Since the waterway is a dynamic waterway, turbulence is easily formed inside the water body during the rotation process, which is beneficial to increase the heat exchange coefficient between the rotating cooling roller and the water body, so that the water body quickly absorbs and transports the heat absorbed by the rotating cooling roller outer casing 9, reduces the surface temperature of the cooling roll, facilitates the rapid heat exchange of the melt with the cooling water body through the cooling roll as an intermediate medium, so that the melt obtains a greater degree of subcooling.

FIG. 7*b* is an axial sectional view of the inner wall of the inner heat exchange passage 8 in which a plurality of strip-shaped heat conducting sheet 8.1 parallel to the axial direction are embedded, which further increases the contact area of the cooling water and the solid heat dissipating member. The radial heat transfer of the water inside and outside the inner heat exchange passage 8 is increased compared with the conventional structure, accordingly increasing the flow rate of the effective cooling water per unit time. At the same time, when the cooling water enters the internal heat exchange passage 8 from the water inlet sleeve 5, the water flow is smooth, the turbulence is reduced, and the smooth flow is ensured through the small hole at the rear end cover 10 and contacts with the rotating cooling roller outer casing 9, which is favorable for increasing cooling capacity of the device and suitable for large-scale industrial mass production.

The surface of the rotating cooling roll outer casing 9 needs to be treated before the melt is casted. The surface treatment may be mechanical cutting, laser etching, or the like, but is not limited to these methods. In the embodiment of the present disclosure, 180 #~2000 # standard sandpaper can be used for grinding, and different sandpapers can be used for cross-grinding during grinding. The ten point average roughness (Rz) of the surface of the rotating cooling roll outer casing 9 is controlled to be 1 to 10 μm. An excessive roughness is advantageous for increasing the heat exchange coefficient, but is also liable to cause heterogeneous nucleation.

During the casting process, the rotation speed is slow, and the spacing of the flaky rare-earth-rich phase will become larger. Fast rotation speed easily results in chill crystal. When the surface speed of the surface of the rotary cooling roll is from 1.5 m/s to 2.25 m/s, microstructure of the alloy cast strip can be fine and uniform. At the same time, the melt casting speed q (casting melt weight/casting time) should be controlled to achieve the best match with the cooling water flow rate Q. When q/Q is 0.05-0.1, the casting cooling effect can be the best. For 600 kg melting furnace commonly used in mass production, q/Q can be, for example, 0.08~0.09, which can reduce the waterway configuration requirements while satisfying cooling capacity. For a small 5 to 50 kg induction melting furnace, q/Q can be, for example, 0.05 to 0.065, and the equipment has the best cooling capacity. If the q/Q is too large, the loss of the rotating cooling roller is large; if the q/Q is too small, the cooling capacity of the device can be improved. When casting, try to make the melt flow smoothly and spread evenly onto the surface of the rotating cooling roll.

The disclosure also provides an alloy cast strip for a fine grain rare earth sintered magnet, having $R_2Fe_{14}B$ main phase grains. The alloy cast strip includes $R_2Fe_{14}$ B main phase, as well as the flaky rare-earth-rich phase embedded in the grains, the inter-grain rare-earth-rich phase and other unavoidable impurity phases. The main components of the alloy cast strip include the rare earth element R, the additive element T, iron Fe and boron B. Wherein R is one or more of La, Ce, Pr, Nd, Sm, Tb, Dy, Ho, Sc, and Y. T is one or more of transition metal elements such as Co, Ni, Cu, Mn, Cr, Ga, V, Ti, Al, Zr, Nb, Mo, and Sn. Among them, the mass ratio of R in the alloy is 29% to 35%. The mass ratio of T in the alloy is ≤5% or the alloy does not contain the additive element T. The mass ratio of B in the alloy is 0.85% to 1.1%. If B amount ratio is too large, it is prone to form $Fe_2B$. If the amount ratio of B element is too small, it is not conducive to the squareness of the magnet. The remaining component in the alloy is Fe. During casting cooling, the difference between average temperature of alloy cast strip on the highest point of rotary cooling roll and melting point of alloy main phase ranges from 300~450° C. In the present disclosure, the main phase of the alloy is $R_2Fe_{14}B$ main phase. The difference between melting point of the $R_2Fe_{14}B$ main phase and the temperature of the alloy cast strip is the degree of subcooling.

The observation of the microstructure of the alloy cast strip of the present disclosure involves two modes: (1) magnetic domain microscopy, that is, a polarizing microscope mode; and (2) scanning electron microscope backscatter mode. Among them, the contrast of the a polarizing microscope observation photo mainly depends on the crystal plane reflection coefficient and the magnetic moment vector, which can more clearly observe the microstructure of the crystal grains and magnetic domains. The contrast of scanning electron microscope backscatter mode observation photo mainly depends on the alloy composition, which is used to observe the composition distribution of the alloy cast strip. For the alloy cast strip, the grain size is larger than the magnetic domain, and the large area with different contrast is caused by different crystal planes of the grain, which is easy to observe, and the finer contrast is the reflection of the magnetic domain. Compared with different crystal plane contrast differences, the magnetic domain contrast is small, and it is affected by the rare-earth-rich phase inside the grain, which is difficult to distinguish in the figure. Therefore, the different contrasts in the figure correspond to different grains.

Figure 3:
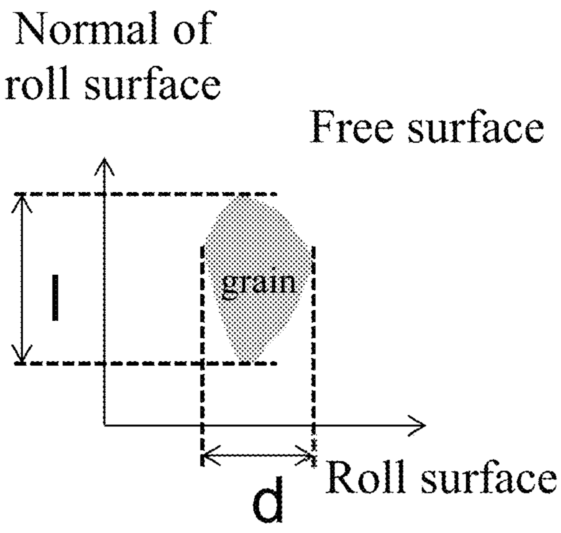
FIG. 3 is a schematic diagram showing the definition of the aspect ratio of the crystal grains.

Observed by a polarizing microscope, the alloy cast strip provided by the present disclosure grows along the cross section of the temperature gradient direction, and no grains are formed from the roll surface to the free surface. Moreover, the alloy cast strip grains are mainly characterized by non-columnar crystals. The grains identified by the different contrasts are no longer elongated columnar crystals grown substantially along the temperature gradient direction, but are approximately equiaxed grains having an aspect ratio of about 1. Here, the definition of the aspect ratio can be seen in FIG. 3. In the section along the thickness direction of the alloy cast strip, the projection of the grain profile on the coordinate axis of the normal direction of the roll surface is defined as the longitudinal length l of the grain, and the projection on the coordinate axis of the roll surface is defined as the lateral width d of the grain. The ratio l/d is the aspect ratio of the grain.

Figure 1:
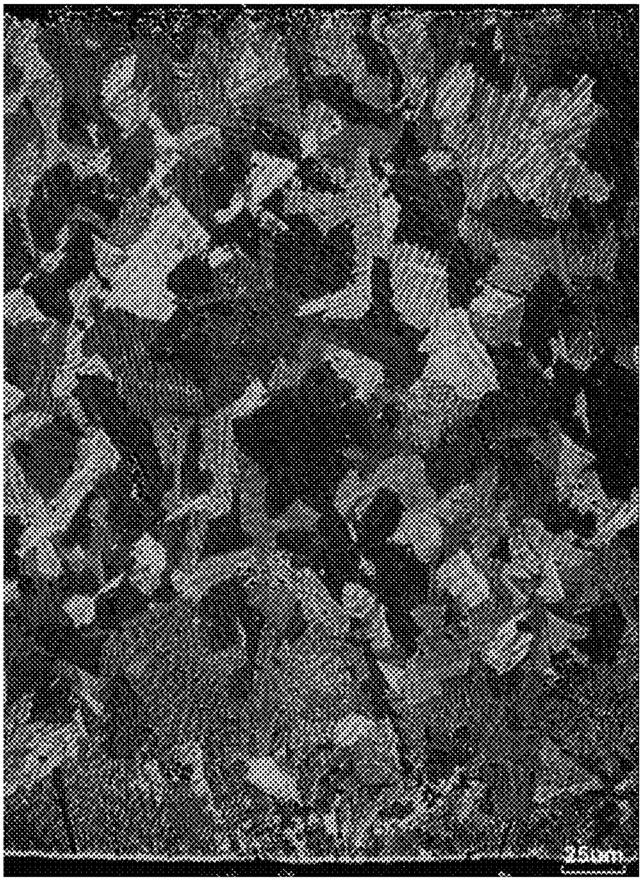
FIG. 1 is a polarizing microscope photograph of an alloy cast strip of the present disclosure.
Figure 2:
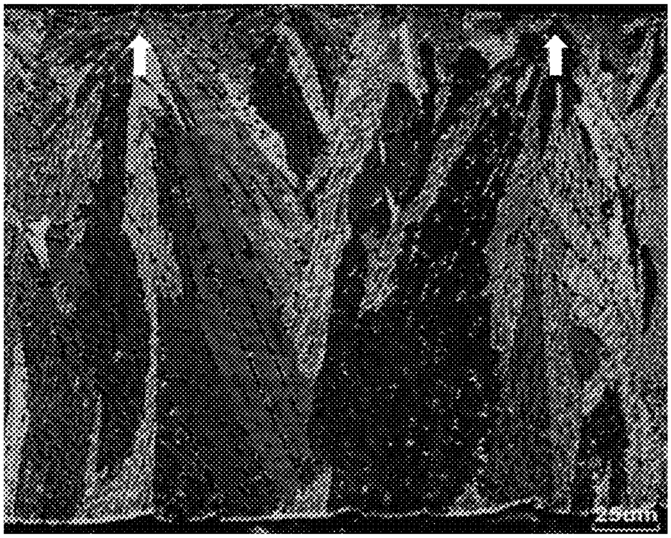
FIG. 2 is a polarizing microscope photograph of an existing alloy cast strip.

In the cross section along the temperature gradient direction, the area of no less than 60% is covered by crystal grains having an aspect ratio of 0.3 to 2, and the columnar crystal area having an aspect ratio of no less than 3 is no more than 15%. Calculated by numbers, the number of the crystal grains having an aspect ratio in the range of 0.3 to 2 is no less than 75%, and the number of columnar crystals having an aspect ratio of no less than 3 is no more than 10%, as shown in FIG. 1, which is characterized with mainly non-columnar crystals. FIG. 2 shows the columnar crystal features in the conventional technologies, and the differences between the two figures are obvious.

The equivalent circle diameter of the grains is 2.5 to 65 μm in a section along a temperature gradient direction. Wherein, the area of the grains having an equivalent circle diameter of 10 to 50 μm is not less than 80%, and the number of grains having an equivalent circle diameter of 15 to 45 μm is not less than 50%. Among them, the grains in the vicinity of 100 μm of the roll surface are small, and the average equivalent circle diameter is 6 to 25 μm. The grain size in the vicinity of 100 μm from the free surface is larger, with the average equivalent circle diameter of 35-50 μm. The equivalent circle diameter of small number of grain scan reach 60-65 μm. Here, the equivalent circle diameter means that the area of the circle having the diameter of the equivalent circle is equal to the grain cross-sectional area. The average equivalent circle diameter is the average value of the grain equivalent circle diameters within a certain area. The equivalent circle diameter of a grain refers to the diameter of a circle having an area equal to the area of the grain.

Observed by scanning electron microscope backscatter mode, the alloy cast strip of the present disclosure has a heterogeneous nucleation center in the cross section of the roll surface along the temperature gradient direction, and the rare-earth-rich phase is radially distributed from the center of the heterogeneous nucleus, but the ratio m of such area to the area of the alloy cast strip is not more than 5%. Heterogeneous nucleation centers were not observed in the rest part. That is, there is no visible heterogeneous nucleation center inside the grain of the alloy cast strip in the area of 95% or more.

Figure 4:
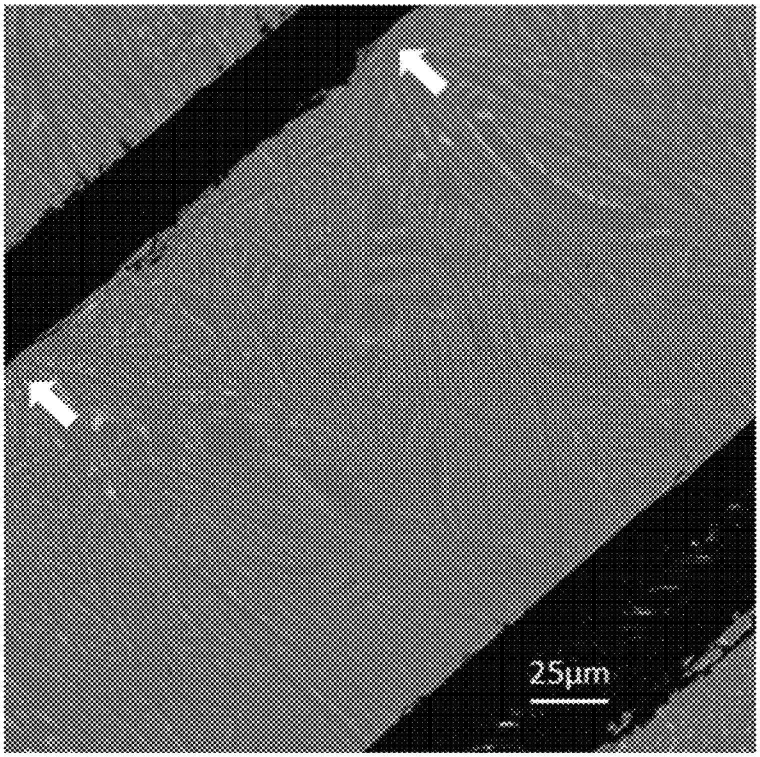
FIG. 4 is a schematic view showing the growth of crystal grains along a temperature gradient in an existing alloy cast strip.

The visible heterogeneous nucleation center is the portion which is first solidified on the surface of the cooling roll due to the small nucleation work on the surface of the cooling roll during melt casting cooling. Then, the crystal grains are grown along the temperature gradient using the portion as a matrix. This is shown in the white arrow marks in FIGS. 2 and 4.

Observed by scanning electron microscope backscatter mode, there is no rare-earth-rich phase or $R_2Fe_{14}B$ main phase grains growing along the cross section of the temperature gradient from roll surface to the free surface. Moreover, in the range of magnification of 800 to 2000, a clear boundary or partial boundary of the crystal grain can be observed, and the rare-earth-rich phases identified by the white contrast which are distributed at the grain boundary and in the grain can be clearly distinguished. Among them, the geometry of the rare earth phase at the grain boundary is in an irregular closed state, and the contour is not smooth. The rare-earth-rich phase in the grain is in the form of flakes or lines, and the profile is smoother than the rare-earth-rich phase at the grain boundaries.

A section along the temperature gradient direction shows a primary crystal axis and a secondary crystal axis grown by the primary crystal axis. Among them, the primary crystal axis boundary is smooth, and the short axis direction width $L_1$ is 1.5 to 3.5 μm. The rare-earth-rich phase between the secondary crystal axes is in the form of a short straight line or a broken dotted line, and the width in the short axis direction $L_2$ is 0.5 to 2 μm. (For the definition of primary crystal axis and secondary crystal axis of the present disclosure, see Example 1.)

Figure 5:
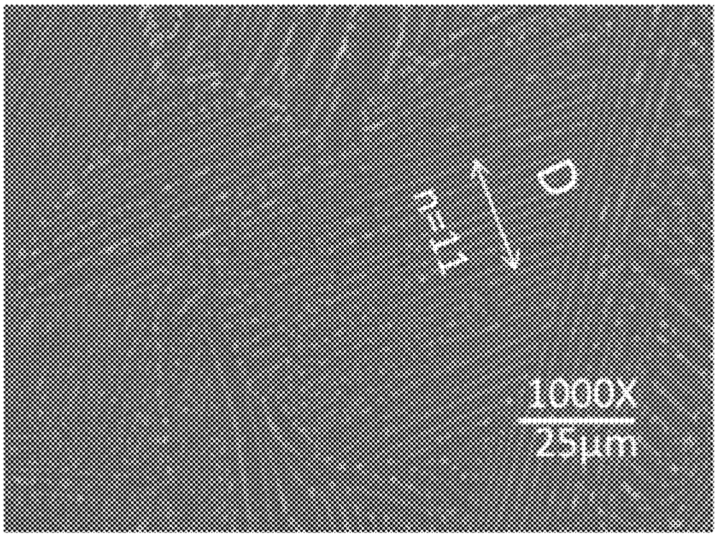
FIG. 5 is a schematic diagram showing the measurement of the spacing of the rare-earth-rich phases.

The rare-earth-rich phase spacing in the alloy cast strip of the present disclosure is 0.5 to 3.5 μm. The flaky rare-earth-rich phase appears as a series of non-strict parallel cluster lines along the temperature gradient direction (where the non-strict parallel cluster fingers are not more than 5 degrees), and different non-strict parallel cluster lines can intersect. The measurement process includes: selecting a linear rare-earth-rich phase in a central portion of the non-strict parallel cluster, and making a straight line perpendicular thereto, and the straight line intersecting the two ends of the non-strict parallel cluster at two points. The distance between the two points measured is D. The number of linear rare-earth-rich phases in the non-strict parallel cluster is n, and the D/(n−1) value is calculated, which is the spacing of the rare-earth-rich phase in the region. For example, from FIG. 5, D is about 25 μm, and the double-arrow line segment spans eleven linear rare-earth-rich phases, i.e., n=11, and the space between neighboring rare-earth-rich phases is about 2.5

The present disclosure is described in further detail below by making reference to Examples and Comparative Examples.

Example 1

Prepare 5 kg of alloy raw material having a composition of $Nd_{31.5}Fe_{67.5}B$ (mass ratio). Before preparation, the raw materials have been derusted. Melting is carried out using a 5 kg induction melting furnace operating at 4 kHz. The metal iron raw material is placed in the bottom of the corundum crucible, and other metals or alloys other than the Nd alloy are randomly placed in the middle of the crucible, and the Nd alloy is placed in the upper part of the crucible. Close the induction melting furnace cover, first pump to a low vacuum of 5 Pa, and then pump to a high vacuum of $5\times10^{-2}$ Pa. After heating for 5 minutes with 5 kW power, the power is increased to 8 kW and heat for 3 minutes, and then power is further increased 10 kW and heat for 2 minutes. At this time, the bottom raw material of the crucible is red and at a high temperature. Then, the power is reduced to 4 kW, and the vacuum valve is closed, and argon gas having a purity of 99.99% is introduced until the pressure reaches 50 kPa. After one minute, open the vacuum valve and pump again to $2\times10^{-2}$ Pa, then close the vacuum valve and refill with argon to 40 kPa. Increase the power to 15 kW and heat the alloy until it begins to melt, and the melt surface temperature is 1150° C. After heating for 2 minutes, the power is decreased to 12 kW and maintained for 2 minutes and then increased to 18 kW. When the temperature reaches 1230° C., power is decreased to 3 kW, and the melt temperature drops to 1190° C. Then increase the power to 20 kW. Repeat the above processes to control the melt surface temperature at 1300° C. until raw material melts completely. Then increase the power to 25 kW and start refining until the melt surface temperature rises to 1400° C., and then reduce the power to 16 kW. A small amount of dross in the melt adheres to the crucible wall under strong electromagnetic stirring. When the melt temperature is stable at 1480° C., the power is approximately 13 kW, and the melt state is stable at this time, and the apparent state is relatively clear.

The Rz of the rotary cooling roll outer cover surface is 1 and the surface linear velocity is 2.25 m/s. The melt casting speed q is 0.1 kg/s. Cooling water flow Q is 7 $m^3$/h, e.g. 1.95 kg/s. Then q/Q=0.05. Alloy cast strip is obtained through casting cooling. The surface temperature of the alloy cast strip is measured to obtain a degree of subcooling of 450° C. when the melt is solidified. During the casting process, as the melt in the crucible is reduced, the heating power is appropriately reduced. After the casting is completed, it is cooled in a water-cooled turntable for 1 hour, and the alloy cast strip is taken out. Fifty alloy cast strips are randomly taken to measure the thickness, which is 0.2 to 0.58 mm.

Figure 9:
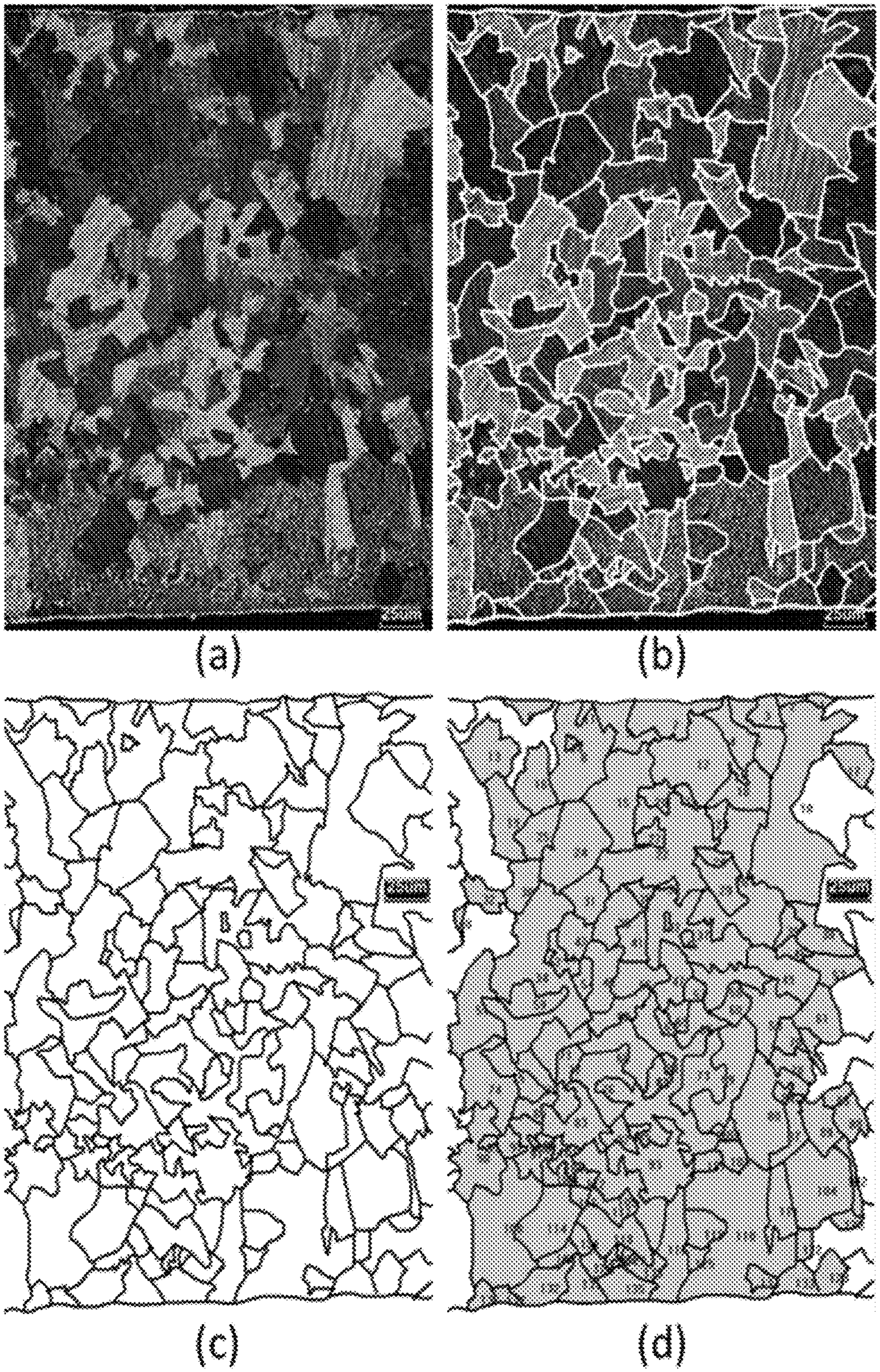
FIG. 9 is a polarizing microscope photograph of the alloy cast strip of Example 1 and the identification of the crystal grains (800 times magnification).

FIG. 1 and FIG. 9(*a*) are photomicrographs of the alloy cast strip under a polarizing microscope. It presents a number of different contrast areas, corresponding to different crystal planes. By performing a manual stroke on FIG. 9(*a*), the morphology of each grain in the alloy cast strip can be discerned as shown in FIG. 9(*b*). FIG. 9(*b*) is binarized to obtain FIG. 9(*c*). Then use the image processing software to remove the incomplete grain portion of the boundary, and count the area of all remaining grains (shown in the shaded part of FIG. 9(*d*)) and the reciprocal of the aspect ratio of the grain. The particle aspect ratio l/d and the equivalent circle diameter r are shown in Table 1. The grain numbers in Table 1 correspond one-to-one with the grain numbers in the shaded area in FIG. 9(*d*).

TABLE 1

Aspect ratios and equivalent circle diameters of the alloy cast crystal grains shown in FIG. 9(a)

| Grain number | Aspect ratio l/d | Equivalent circle diameter r/μm |
|---|---|---|
| 1 | 0.421 | 7.719 |
| 2 | 0.308 | 6.236 |
| 3 | 0.759 | 15.802 |
| 4 | 1.400 | 21.683 |
| 5 | 1.256 | 23.309 |
| 6 | 0.459 | 13.145 |
| 7 | 0.368 | 27.883 |
| 8 | 1.409 | 39.908 |
| 9 | 0.692 | 21.764 |
| 10 | 1.744 | 60.415 |
| 11 | 1.394 | 6.025 |
| 12 | 0.850 | 41.647 |
| 13 | 1.000 | 28.347 |
| 14 | 1.091 | 4.575 |
| 15 | 1.400 | 38.746 |
| 16 | 1.520 | 25.595 |
| 17 | 0.761 | 20.172 |
| 18 | 0.705 | 24.401 |
| 19 | 1.769 | 28.187 |
| 20 | 0.825 | 13.421 |
| 21 | 0.979 | 8.081 |
| 22 | 0.814 | 47.701 |
| 23 | 1.756 | 11.252 |
| 24 | 1.161 | 37.876 |
| 25 | 1.036 | 22.336 |
| 26 | 1.335 | 43.503 |
| 27 | 0.889 | 12.036 |
| 28 | 0.447 | 10.281 |
| 29 | 1.008 | 22.627 |
| 30 | 1.370 | 21.032 |
| 31 | 1.103 | 22.979 |
| 32 | 0.733 | 16.915 |
| 33 | 0.447 | 4.347 |
| 34 | 1.522 | 51.282 |
| 35 | 0.794 | 10.005 |
| 36 | 1.108 | 23.251 |
| 37 | 0.714 | 41.038 |
| 38 | 0.745 | 23.051 |
| 39 | 1.359 | 12.950 |
| 40 | 2.444 | 5.686 |
| 41 | 1.485 | 18.881 |
| 42 | 1.198 | 19.734 |
| 43 | 2.909 | 3.186 |
| 44 | 1.409 | 12.974 |
| 45 | 1.261 | 6.225 |
| 46 | 0.580 | 11.364 |
| 47 | 1.629 | 22.483 |
| 48 | 1.682 | 24.163 |
| 49 | 0.726 | 27.148 |
| 51 | 1.783 | 33.562 |
| 52 | 1.235 | 3.288 |
| 53 | 0.482 | 19.776 |
| 54 | 2.049 | 12.600 |
| 55 | 0.537 | 21.124 |
| 56 | 0.530 | 22.772 |
| 57 | 0.917 | 11.134 |
| 58 | 1.216 | 27.088 |
| 59 | 0.493 | 20.779 |
| 60 | 1.011 | 17.087 |
| 61 | 1.070 | 24.865 |
| 62 | 0.739 | 18.855 |
| 63 | 1.266 | 42.631 |
| 65 | 1.271 | 11.994 |
| 66 | 0.798 | 17.071 |
| 67 | 1.159 | 8.682 |

TABLE 1-continued

Aspect ratios and equivalent circle diameters of the alloy cast crystal grains shown in FIG. 9(a)

| Grain number | Aspect ratio l/d | Equivalent circle diameter r/μm |
|---|---|---|
| 68 | 0.870 | 26.510 |
| 69 | 1.618 | 33.974 |
| 70 | 0.986 | 15.360 |
| 71 | 0.956 | 22.530 |
| 72 | 1.643 | 10.026 |
| 73 | 1.386 | 26.459 |
| 74 | 1.568 | 30.974 |
| 75 | 0.850 | 19.887 |
| 76 | 1.171 | 27.181 |
| 77 | 1.383 | 14.822 |
| 78 | 0.696 | 16.868 |
| 79 | 1.034 | 20.330 |
| 80 | 1.389 | 40.311 |
| 81 | 1.500 | 6.363 |
| 82 | 1.355 | 13.435 |
| 83 | 0.918 | 27.001 |
| 84 | 0.975 | 7.560 |
| 85 | 0.726 | 10.875 |
| 86 | 0.553 | 13.448 |
| 87 | 1.791 | 17.842 |
| 88 | 1.260 | 18.497 |
| 89 | 1.277 | 21.902 |
| 90 | 1.614 | 31.257 |
| 91 | 1.380 | 20.072 |
| 92 | 0.880 | 13.389 |
| 93 | 0.862 | 33.393 |
| 94 | 1.051 | 7.788 |
| 95 | 0.523 | 5.485 |
| 96 | 0.864 | 4.411 |
| 97 | 0.984 | 12.505 |
| 98 | 0.636 | 5.495 |
| 99 | 0.622 | 5.818 |
| 100 | 1.316 | 3.074 |
| 101 | 1.483 | 5.821 |
| 102 | 2.912 | 10.055 |
| 103 | 0.886 | 14.603 |
| 104 | 1.164 | 40.106 |
| 105 | 1.046 | 30.185 |
| 106 | 0.910 | 11.259 |
| 107 | 0.656 | 11.767 |
| 108 | 1.587 | 47.192 |
| 109 | 0.676 | 11.114 |
| 110 | 1.076 | 58.392 |
| 111 | 2.465 | 22.894 |
| 112 | 0.755 | 9.215 |
| 114 | 1.020 | 33.117 |
| 115 | 1.075 | 9.370 |
| 116 | 2.814 | 29.253 |
| 117 | 0.664 | 16.717 |
| 118 | 0.743 | 27.724 |
| 119 | 0.839 | 19.920 |
| 120 | 0.522 | 10.566 |
| 121 | 1.370 | 11.620 |
| 122 | 2.000 | 11.381 |
| 123 | 0.636 | 11.751 |
| 124 | 2.000 | 4.277 |
| 125 | 0.907 | 9.976 |
| 126 | 1.739 | 4.829 |
| 127 | 1.350 | 4.352 |
| 128 | 0.902 | 11.947 |
| 129 | 1.219 | 17.874 |
| 130 | 0.564 | 13.662 |
| 131 | 0.908 | 19.678 |
| 132 | 0.641 | 23.265 |
| 133 | 0.641 | 17.620 |
| 134 | 0.687 | 11.421 |
| 135 | 0.475 | 21.201 |
| 136 | 1.054 | 11.958 |
| 137 | 0.556 | 9.254 |

From Table 1, l/d in this partial region is 0.3 to 3, in which the area ratio of grains having lid of 0.3 to 2 is about 98%, the number ratio of such grains is 96.3%, and there is no grain having an aspect ratio greater than or equal to 3. The grain having the largest area is grain No. 10, which has a radius r of about 60 μm. The grain having the smallest area is grain No. 100, which has a radius r of about 3.074 μm. For grains with r of 10 to 50 μm, their area ratio is about 82.3%, and the number ratio of grains having r of 10 to 45 μm is about 51.2%. Overall, the grains near the side of the roll surface are small, and the ones near the side of the free surface is large. In the range of 100 μm from the side of the roll surface, the average equivalent circle diameter of the grains is about 6 to 15 and the average equivalent circle diameter of the grains is from 25 to 40 μm in the range of 100 μm from the free surface side. It is worth noting that in FIG. 1 and FIG. 9(*a*), there are large abnormal grains near the side of the roll surface. On the one hand, it may be because the orientation of some grains is affected by the cooling roll surface, and the grain orientation degree is relatively higher than the side of the free surface, so that it is difficult to distinguish the grain boundaries; on the other hand, the cooling process may not be fast enough, resulting in some small grains recrystallizing to form larger grains.

Note: Due to the influence of the Nd-rich phase inside the alloy cast strip, it is difficult for the computer to automatically identify the grain boundaries according to different contrasts. Manual stroke may be an accurate way to distinguish such alloy cast strips. Although there may be some errors, the measurement data will not affect the corresponding statistical regularity of the test quantity because of the statistics of a large number of grains. For the range of grain sizes, the error caused by the measurement is negligible.

Figure 10:
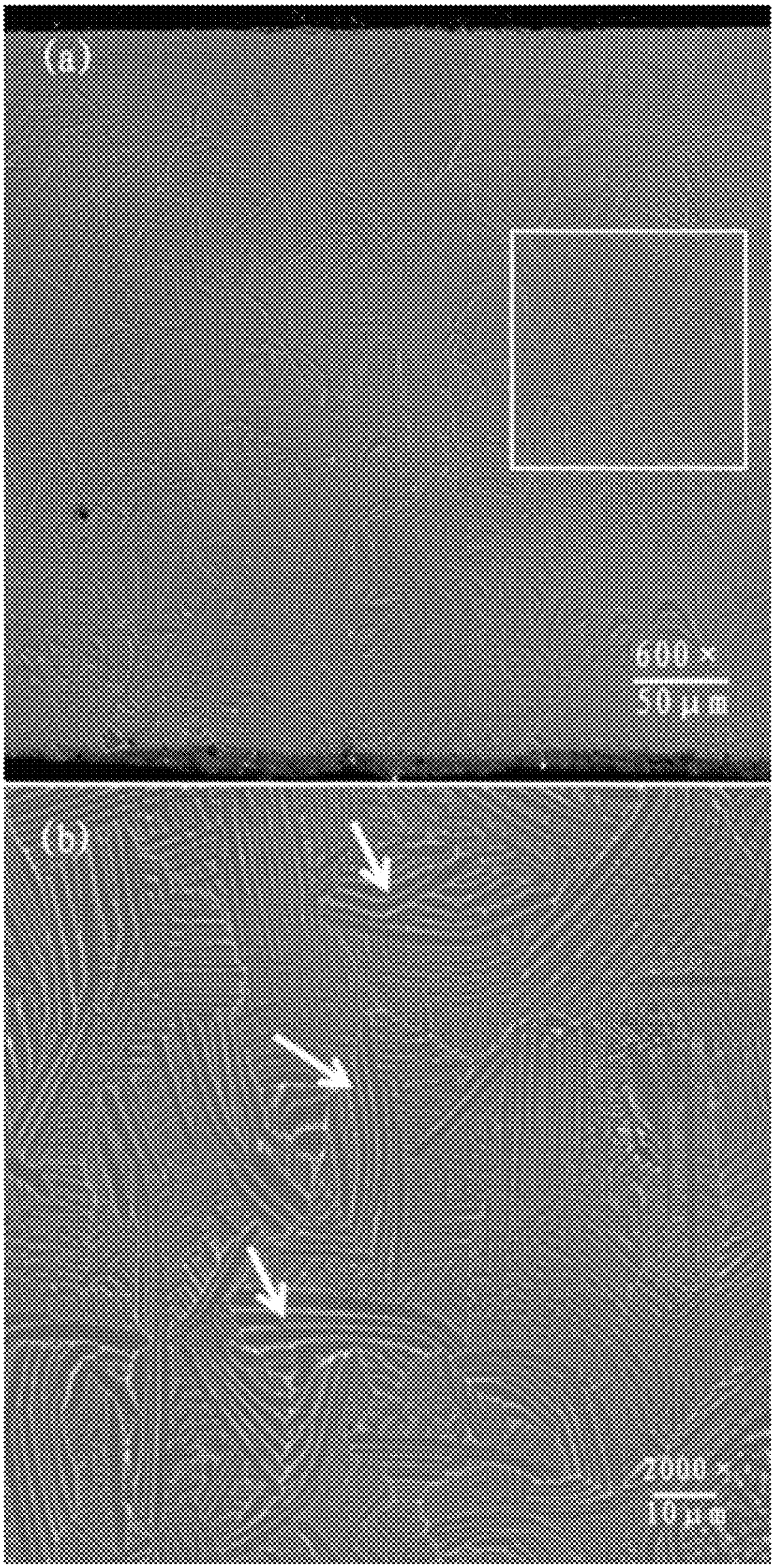
FIG. 10 is a scanning electron microscope (SEM) photograph of alloy cast strip in Example 1.

FIG. 10(*a*) is an overall photograph of the cross section of the alloy cast strip in the temperature gradient direction of the present embodiment, the magnification is 600 times, the upper portion is a free surface, and the lower portion is a roller surface. It can be seen from FIG. 10(*a*) that along the temperature gradient section, there is no heterogeneous nucleation center as indicated by the white arrows in FIG. 2 and FIG. 4, and the flaky Nd-rich phase is randomly distributed in the direction of the long axis, not in radial shape along the temperature gradient direction. No flaky grains were observed to grow from the roll surface to the free surface. FIG. 10(*b*) is a photograph when the white rectangular frame area in FIG. 10(*a*) is enlarged to 2000 times. As can be seen from FIG. 9, the Nd-rich phase of the grain boundary is in an irregular closed state, and a flaky or linear Nd-rich phase inside the grain is embedded in the grain. This is further confirmed by polarized microscope photo and scanning electron microscope backscatter photo in the subsequent examples.

As can be seen from FIG. 10(*b*), the grain size in this region is 20 to 25 μm. The Nd-rich phase spacing is 0.6 to 2.7 μm. The flaky grains have two states, some of which are coarser, as shown by the white arrow in FIG. 10(*b*), and the Nd-rich phase spacing is about 1.5 to 2.7 μm. These flaky main phase grains are the portions which are preferentially solidified. More flaky grains are relatively small, and the Nd-rich phases are spaced apart by about 0.5 to 1.8 μm, some of which are produced by the coarser flaky main phase grains on the side perpendicular to the long axis. There are relatively coarse plate-like crystal regions and a finer plate-like crystal regions. In the present disclosure, coarser flaky grains are a primary crystal axis and finer flaky grains are a secondary crystal axis. In the scanning electron microscope backscatter mode, the Nd-rich phase of the primary crystal axis is smooth and bright, and the contrast of the secondary crystal axis is slightly dark, showing in form of a short straight line or a broken line. In the rapid non-equilibrium solidification process provided by the present disclosure, the high temperature melt undergoes a greater degree of subcooling and reaches near the ternary eutectic temperature of the alloy in a short time (corresponding to $E_2$ in the ternary liquid phase projection of NdFeB, where the main phase T1, the boron-rich phase T2, and the Nd-rich phase are simultaneously precipitated from the liquid phase at this point). Under this extreme condition, the tendency of the main phase grains and the Nd-rich phase along the temperature gradient are weakened by effect of the specific melt state, greater supercooling degree and temperature gradient, and eutectic or eutectoid growth is dominant and form Feature morphology. The spacing of Nd-rich phases of alloy cast strip is smaller and the difference between the roll surface and the free surface is smaller than in the conventional technologies.

In FIG. 9 and FIG. 10, the alloy cast strip grains of the present disclosure are mainly non-columnar grains, and most of them are homogeneous nucleation of the melt, and l/d is 0.3-2, and no growth of l/d>3 main phase grains along the temperature gradient is observed. The Nd-rich phase spacing is smaller and is more suitable for preparing fine grain rare earth sintered magnets.

Select the same batch of 5 alloy cast strips for calculation, and find the average value. The relevant parameters are listed in Table 2. The difference of maximum thickness and minimum thickness of the alloy cast strips used for the measurement is at least 0.2 mm.

The alloy cast strip is crushed sequentially by hydrogen crushing and jet mill to prepare powders, and the powders are press formed, sintered, and the like to form magnets. After the jet milling, the particle size of the powders is measured using a laser particle size analyzer. After heat treatment, three sintered samples were randomly selected, and the rare earth components of the sintered samples were tested by inductive plasma atomic emission spectrometry (ICP-AES), and the performance parameters of the magnets were measured. The specific values are shown in Table 3.

Comparative Example 1

Prepare 5 kg of alloy raw material having a composition of $Nd_{31.5}Fe_{67.5}B$ (mass ratio) and the alloy raw materials before preparation are subjected to rust removal treatment. Melting is carried out using a 5 kg induction melting furnace operating at 4 kHz. The metal iron raw material is placed in the bottom of the corundum crucible, and other alloys except the Nd alloy are randomly placed in the middle of the crucible, and the Nd alloy is placed on the upper part of the crucible. Close the induction melting furnace cover, pump to a low vacuum of 5 Pa, then pump to a high vacuum of $2\times10^{-2}$ Pa. After heating for 5 minutes with 5 kW power, the power is increased to 8 kW and heat for 3 minutes, and power is further increased to 10 kW and heat for 2 minutes. The raw material at the bottom of the crucible has been red and at a high temperature. The vacuum valve is closed and charged with argon gas to 40 kPa, and then the power is increased to 15 kW to continue heating, and after 2 minutes, the power is again raised to 25 kW. The raw materials in the refining process are completely melted and the temperature is finally stabilized at 1400° C. when the melt is casted, and the casting speed q is 0.1 kg/s. Cool down with a conventional cooling roll without internal thread structure, and the cooling water flow Q of the rotary cooling roller is 7 $m^3/h$, which is 1.95 kg/s. And q/Q=0.05, the same as Example 1. Using the same estimation method as in Example 1, the degree of subcooling during melt solidification was about 298° C. Finally, an alloy cast strip having an average thickness of 0.3 mm is obtained. Remaining preparation process and measurement methods are the same as in Example 1.

Figure 11:
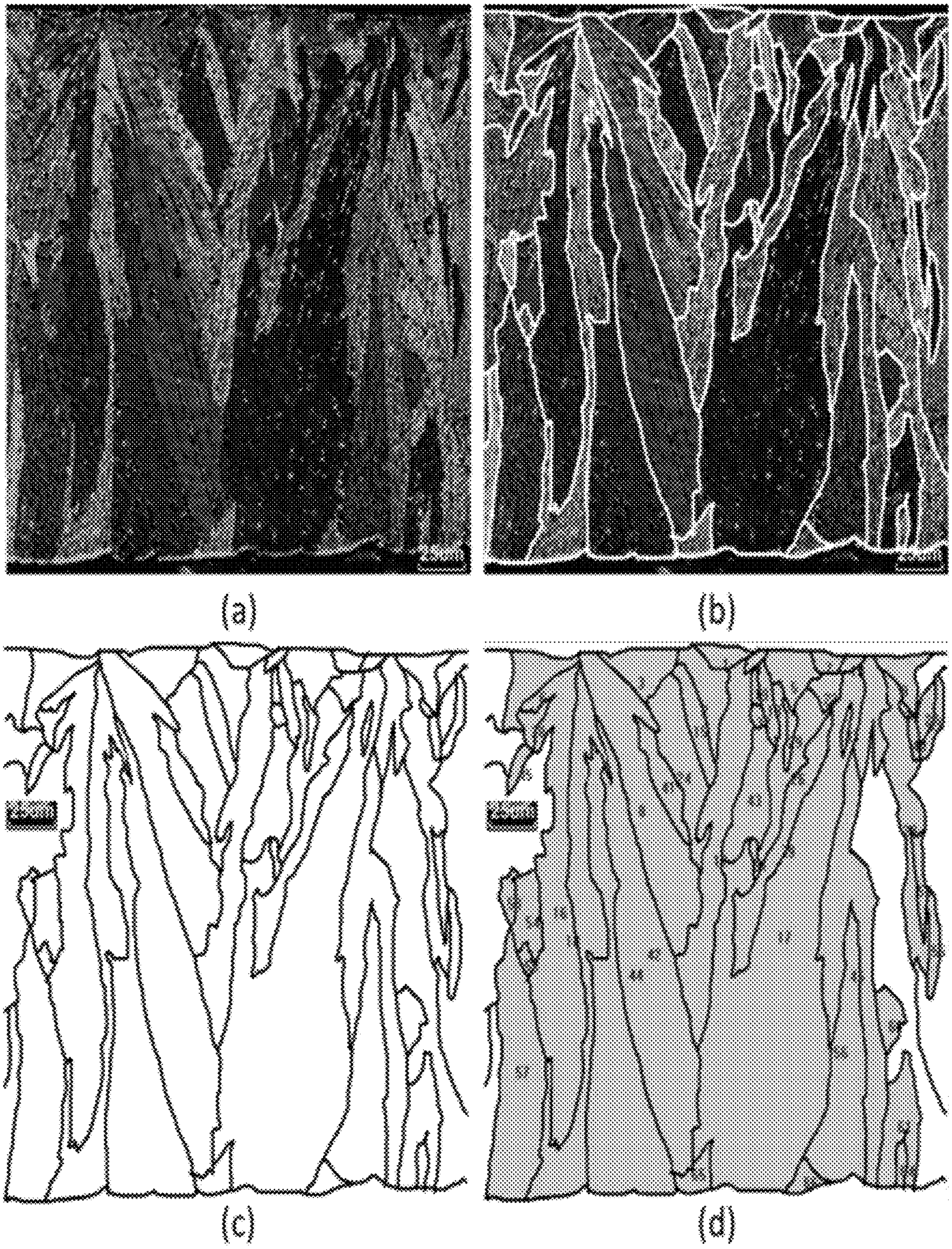
FIG. 11 is polarizing microscope photograph of the alloy cast strip and the identification of the crystal grains of Comparative Example 1.

FIG. 11(*a*) is a polarizing microscope photograph of the microstructure of the alloy cast strip of Comparative Example 1. FIGS. 11(*b*), 11(*c*), and 11(*d*) show the same grain measurement method as that of FIG. 9, and specific data of the grain aspect ratio and the equivalent circle diameter are shown in Table 4. It can be seen from the figure that the alloy cast strips are mainly in columnar shape along the cross section of the temperature gradient direction, and the columnar grains grow radially from heterogeneous nucleation of the roll surface toward the free surface. It is estimated that the area ratio of grains having an l/d of 0.3 to 2 is only about 15%, and the number ratio of such grains is only 44%. The area ratio of grains with r of 10 to 50 μm is 31%, and more grains have r>50 μm. That is, the average grain size thereof is larger than that in Example 1.

Figure 12:
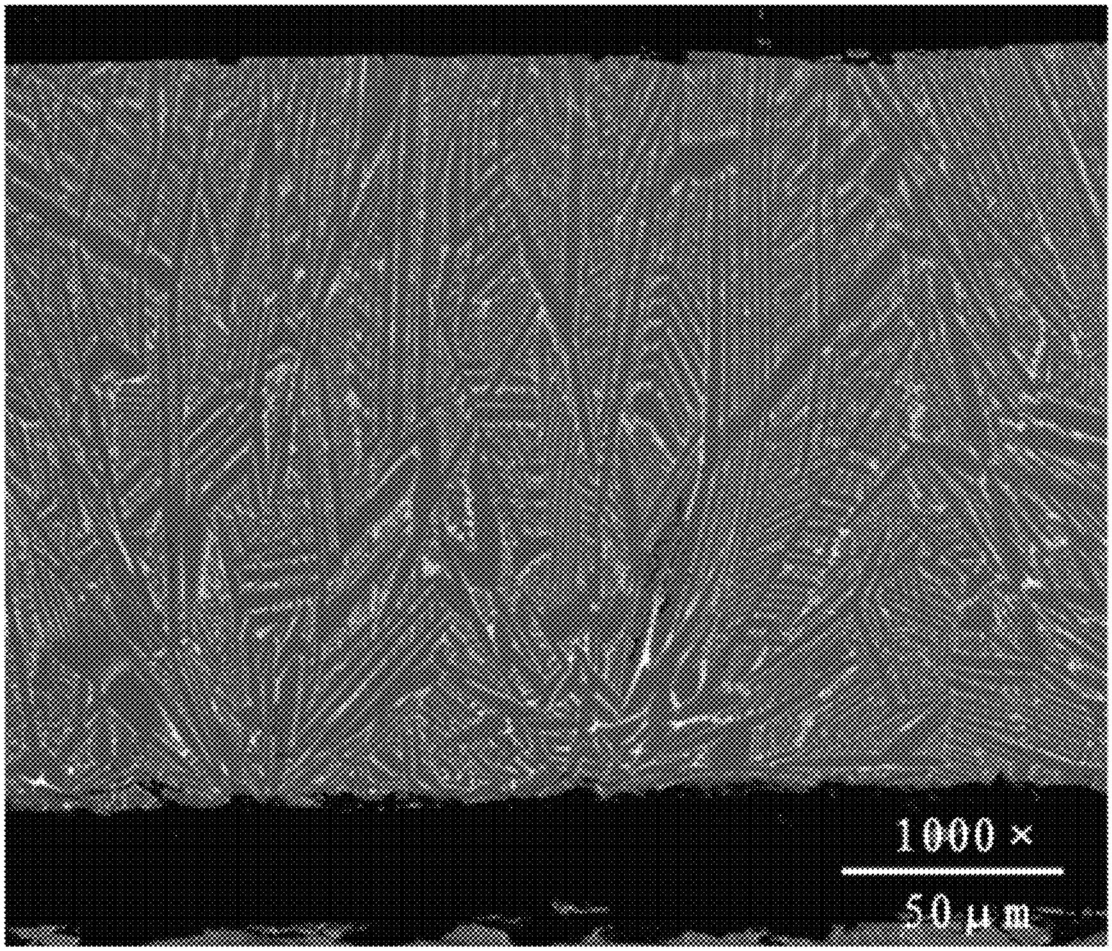
FIG. 12 is a scanning electron microscope (SEM) photograph of alloy cast strip in Comparative Example 1.

FIG. 12 is a scanning electron microscope backscattered photograph of an alloy cast strip. It can be seen from the figure that the white Nd-rich phase is radially distributed along the direction of the temperature gradient from the center of the heterogeneous nucleation, with spacing of about 3 to 10 μm. The grain boundary and the Nd-rich phase cannot be recognized in this figure, and its distribution characteristics are obviously different from those shown in FIG. 10 in the Example 1. The white Nd-rich phase distribution is affected by the temperature gradient, and the grain boundary and the interior distribution of the rare-earth-rich phase along the temperature gradient are dominant. The rich phase distribution in other directions is less. The rare-earth-rich phase at the grain boundary does not show a closed distribution. In FIG. 12, there are many lateral (approximately perpendicular to the temperature gradient direction) and shorter flaky grains among the main phase grains radially growing from the surface of the roll to the free surface, which is defined as a secondary crystal axis in the present disclosure. However, the morphology is different from that in Example 1.

Another five alloy cast strips with different thickness are selected for testing. The test results can be seen in Tables 2 and 3.

TABLE 2

Structural parameters of alloy cast strips in Example 1 and Comparative Example 1

| | l/d∈ [0.3, 2] grain ratio | l/d > 3 Grain % | r∈ [10, 50] grain area ratio | r∈ [15, 45] grain number ratio | m | $L_1$(μm) | $L_2$(μm) |
|---|---|---|---|---|---|---|---|
| Example 1 | Area: 97%<br>Number: 96.3% | Area: 0%<br>Number: 0% | 80% | 50% | 0% | 1.5-2.7: | 0.5-1.8: |
| Comparative Example 1 | Area: 15%<br>Number: 40% | Area: 52%<br>Number: 35% | 32% | 34% | 97.5% | 3-9.5: | 1.5-2.3: |

Where m is the area ratio of the rare-earth-rich phase having a radial pattern.

TABLE 3

Test data of particle size and magnet properties of the powders prepared in Example 1 and Comparative Example 1

| | Prepare powder by jet mill | | | TRE | $B_r$ | $H_{cJ}$ | $(BH)_{Max}$ |
|---|---|---|---|---|---|---|---|
| | $D_{10}$ | $D_{50}$ | $D_{90}$ | (wt. %) | (kGs) | (kOe) | (MGOe) |
| Example 1 | 1.36 | 3.45 | 6.57 | 30.7 | 13.29 | 9.63 | 42.41 |
| Example 1 | | | | 30.4 | 13.29 | 9.58 | 42.33 |
| Example 1 | | | | 30.6 | 13.28 | 9.60 | 42.38 |
| Comparative Example 1 | 1.55 | 3.94 | 7.58 | 30.2 | 13.29 | 9.53 | 42.23 |
| Comparative Example 1 | | | | 30.3 | 13.26 | 9.52 | 42.09 |
| Comparative Example 1 | | | | 30.0 | 13.31 | 9.50 | 42.13 |

Where TRE (wt. %) is the total rare earth weight percentage, Br, $H_{cJ}$ and $(BH)_{Max}$ are respectively premanence, coercivity and maximum energy product of the magnet at room temperature.

As can be seen from the data in Table 3, the powders prepared from the alloy cast strip of Example 1 have a smaller particle size, $D_{90}/D_{10}$. It is relatively small, namely more uniform and fine, which is favorable for grain refinement of sintered magnets. In the prepared sintered magnet, the rare earth content TRE is about 0.3% by weight higher than that of Comparative Example 1, and the coercive force $H_{cJ}$ and maximum magnetic energy product $(BH)_{Max}$ are relatively high, with no significant change in remanence Br. The overall performance of the magnet is improved. When jet mill powder particle size $D_{50}$ is close to or smaller than the spacing of the Nd-rich phases, the rare earth utilization rate is obviously improved, and the improvement of the coercivity of the magnet prepared by alloy casting strip with the same formula will be more obvious.

TABLE 4

Aspect ratio and equivalent circle diameter of the alloy cast strip crystal grains shown in FIG. 11(a)

| Grain number | Aspect ratio l/d | Equivalent circle diameter r/μm |
|---|---|---|
| 1 | 0.321 | 13.903 |
| 2 | 1.750 | 23.863 |
| 3 | 0.512 | 23.947 |
| 4 | 0.780 | 6.346 |
| 5 | 0.843 | 21.887 |
| 6 | 0.818 | 24.190 |
| 7 | 0.500 | 10.656 |
| 8 | 1.969 | 55.660 |
| 9 | 0.858 | 17.655 |

TABLE 4-continued

Aspect ratio and equivalent circle diameter of the alloy cast strip crystal grains shown in FIG. 11(a)

| Grain number | Aspect ratio l/d | Equivalent circle diameter r/μm |
|---|---|---|
| 10 | 0.444 | 6.711 |
| 11 | 2.861 | 23.971 |
| 12 | 4.012 | 49.714 |
| 13 | 3.425 | 13.756 |
| 15 | 2.292 | 20.556 |
| 16 | 5.993 | 62.650 |
| 17 | 2.407 | 106.045 |
| 18 | 5.324 | 51.783 |
| 19 | 3.786 | 6.103 |
| 22 | 0.896 | 13.546 |
| 23 | 5.050 | 34.750 |
| 24 | 2.492 | 34.193 |
| 25 | 2.978 | 11.490 |
| 26 | 2.097 | 28.689 |
| 27 | 2.879 | 11.942 |
| 29 | 4.708 | 8.316 |
| 30 | 1.226 | 11.110 |
| 31 | 1.050 | 3.710 |
| 32 | 1.185 | 6.887 |
| 33 | 4.000 | 5.015 |
| 39 | 2.080 | 32.655 |
| 40 | 3.778 | 8.098 |
| 41 | 1.883 | 21.648 |
| 42 | 3.518 | 68.843 |
| 43 | 2.102 | 30.214 |
| 44 | 4.02 | 65.204 |
| 45 | 1.59 | 9.458 |
| 46 | 4.95 | 52.130 |
| 50 | 6.00 | 11.669 |
| 51 | 3.33 | 5.747 |
| 53 | 2.67 | 10.980 |
| 54 | 2.46 | 21.973 |
| 55 | 8.57 | 13.234 |
| 56 | 3.56 | 46.702 |
| 57 | 3.66 | 52.511 |
| 58 | 1.58 | 7.533 |
| 60 | 1.76 | 16.701 |
| 61 | 2.52 | 28.817 |
| 64 | 3.78 | 8.663 |
| 65 | 1.08 | 14.828 |
| 66 | 0.68 | 12.094 |

Example 2

Prepare alloy raw material 600 kg with components of $Nd_{24.4}Pr_{6.1}DyCoCu_{0.1}Al_{0.65}Ga_{0.1}B_{0.97}Fe_{bal}$ (mass ratio). It is smelted in a 600 kg induction melting furnace. The main steps are similar to those of Example 1, but the corresponding power adjustment range is larger. When the impurity gas in the alloy is excluded, the power fluctuates between 120 kW and 240 kW, and then the argon gas having a purity of 99.99% is introduced to increase the pressure to 40 kPa. Vacuum again to $2.2\times10^{-2}$ Pa, refill with argon to 40 kPa. The power is increased for melting, and the power varies from 380 kW to 520 kW. After cyclical overheat treatment, the raw material is completely melted before the melt is heated to 1300° C. Use a rotary cooling roll as shown in FIG. 7*a*, and the temperature at the time of cooling casting is 1400° C. The melt casting speed q is controlled to be 0.8 kg/s. Cooling water flow Q is 40 $m^3$/h, which is 11.11 kg/s. Then q/Q=0.07. The surface of the rotary cooling roll is Rz=8.6 μm, and the surface linear speed of the cooling roll surface during the casting is 1.5 m/s. An alloy cast strip having a thickness of 0.12 to 0.48 mm is prepared. The melt solidification process has a degree of subcooling of up to 365° C.

Figure 13:
FIG. 13 is a polarizing microscope photograph (800× magnification) of the alloy cast strip of Example 2.
Figure 14A:
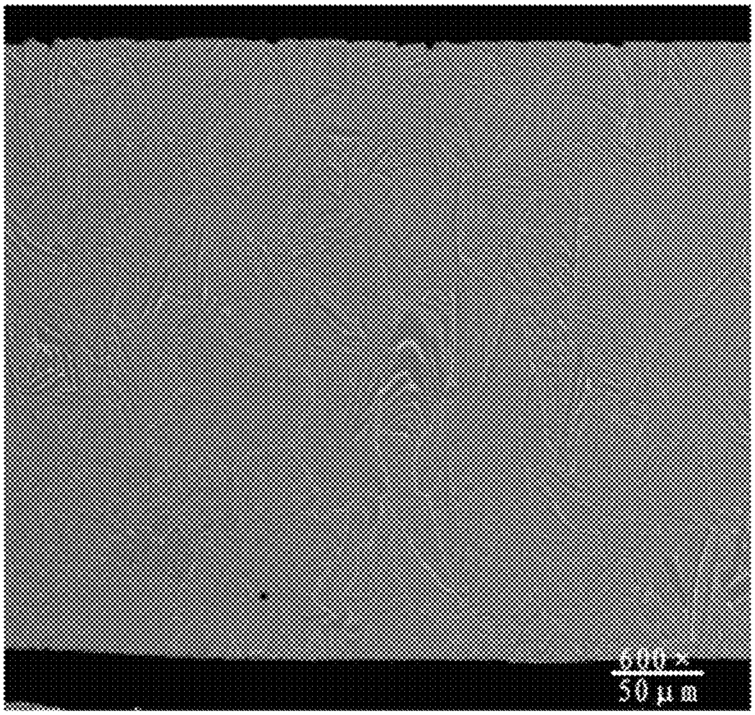
FIG. 14a is a scanning electron microscope photograph (600× magnification) obtained in situ in the observation area of FIG. 13.
Figure 14B:
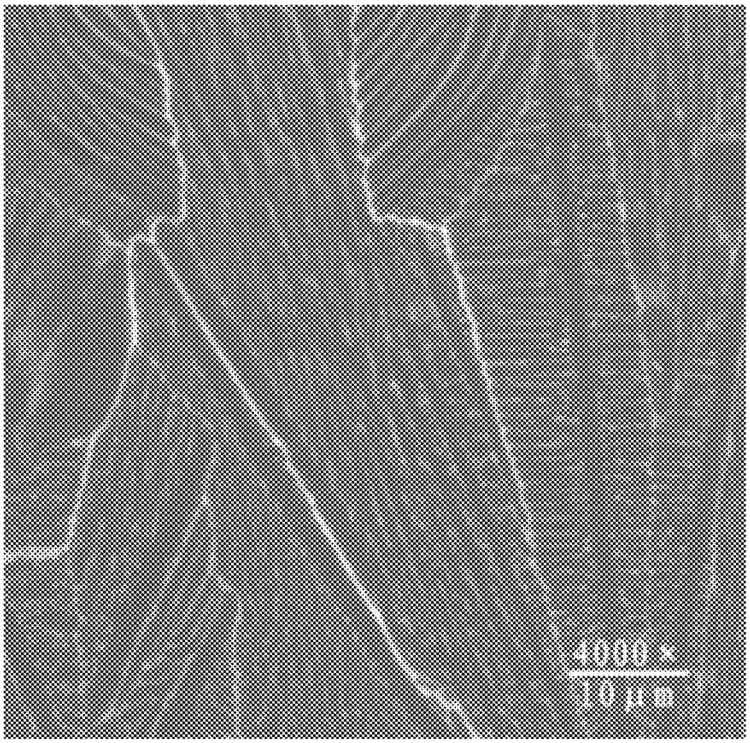

As can be seen from FIG. 13 and FIG. 14*a*, the grain size of the alloy cast strip of Example 2 is relatively uniform and fine, r is approximately distributed in the range of 3 to 60 μm, but l/d is relatively large, namely 0.3 to 4. The rare-earth-rich phase distribution is non-radial, with a spacing of about 0.8 to 2.8 μm, and larger in some regions. The heterogeneous nucleation center is visible in the lower right corner of FIG. 14*a*. However, the rare-earth-rich phase did not exhibit a through-radial growth and soon terminated at about 70 μm from the surface of the roll. Based on the area shown in FIG. 14*a*, the area ratio is about 5%. At the same time, the distribution of some grain boundaries and the rare-earth-rich phase inside the grain can be clearly observed. FIG. 14*b* is a partial photograph of the central portion near the surface of the roll surface of FIG. 14*a* magnified 4000 times. The primary crystal axis is located in the middle of the grains, and the secondary crystal axis is grown perpendicular to the axial direction of the primary axis. Comparing FIG. 13 with FIG. 14*a*, it can be seen that the rare-earth-rich phase of the grain boundary is in an irregular closed state, and the rare-earth-rich phase in the grain is relatively regular, and is in a smooth line or intermittent short-line state, and the spacing is about 0.5-1.8 μm. Five alloy strips with different thicknesses were selected and their characteristic parameters are listed in Table 5. The maximum thickness and minimum thickness of the selected alloy strips differed by at least 0.2 mm.

Example 3

Figure 15:
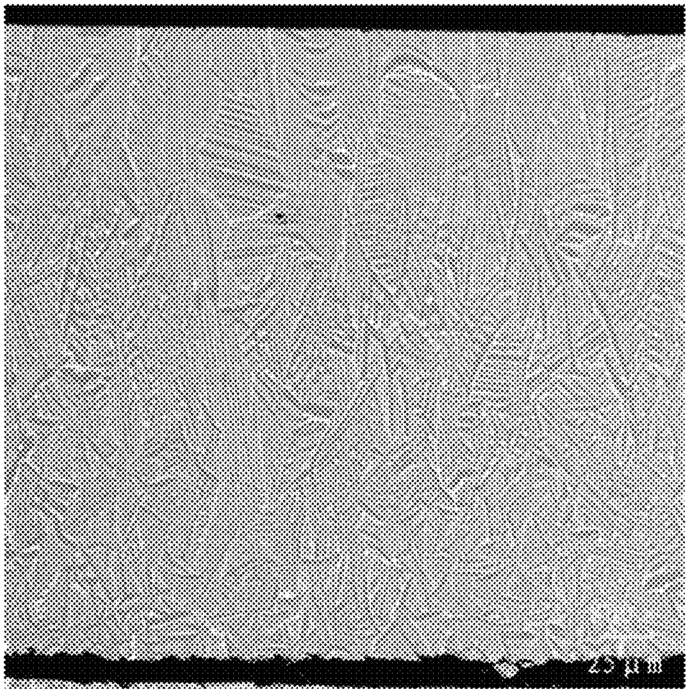
FIG. 15 is a scanning electron microscope photograph of alloy cast strip in embodiment 3.
Figure 16:
FIG. 16 is a polarizing microscope photograph of the alloy cast strip in Example 3.

The alloy composition is $Nd_{26.3}Pr_{8.6}Ga_{0.56}$ $Al_{0.19}Cu_{0.1}Zr_{0.19}B_{0.89}Fe_{bal}$, casting temperature is 1500° C., Rz=10 μm, surface linear velocity is 2 m/s, melt casting speed q is 1 kg/s, and cooling water flow Q is 36 $m^3$/h, that is, Q is 10 kg/s, q/Q=0.1. The rest is the same with Example 2. The degree of subcooling during melt solidification is 300° C., and the characteristics of the alloy cast strips are shown in FIG. 15 and FIG. 16. The alloy cast strip test data is shown in Tables 5 and 6.

FIG. 15 and FIG. 16 show in situ observations to further verify the structural characteristics of the aforementioned alloy cast strip. The specific form of the alloy cast strip of Example 3 is more similar to that of Example 2, and is affected by the temperature greater than that of Example 1. At 800× magnification, the backscattering mode of the scanning electron microscope is used to observe that the grain boundaries near the free surface are more clear, while the roll surface is basically unable to distinguish the grain boundaries. The more detailed internal structure is similar to that of Example 2 and will not be repeated here.

Figure 19:
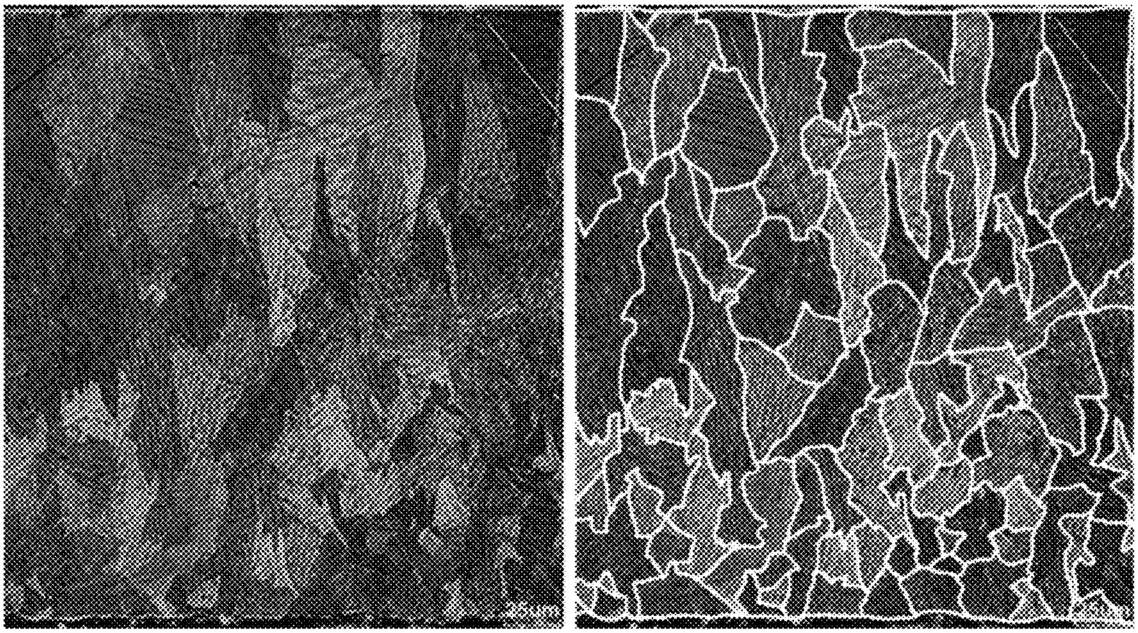
FIG. 19 is a photograph showing the grain identification of FIG. 16.

Table 7 is the grain aspect ratio and equivalent circle diameter data obtained after performing identification process of the alloy cast strip in Example 3 (FIG. 16) as the same with that in FIG. 9 (FIG. 19).

Comparative Example 2 and Comparative Example 3

Figure 17:
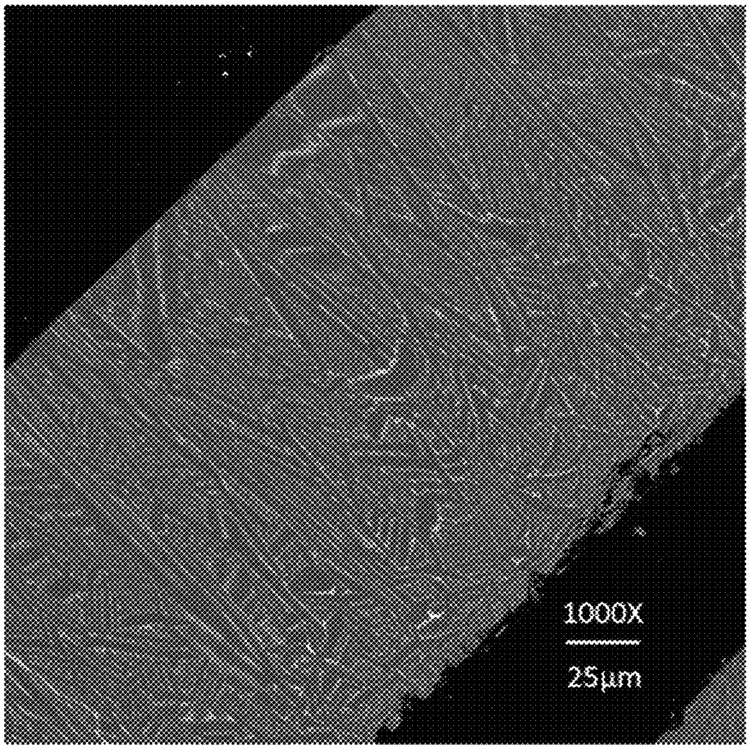
FIG. 17 is a scanning electron microscope (SEM) photograph (1000-fold magnification) of alloy cast strip of Comparative Example 2.
Figure 18:
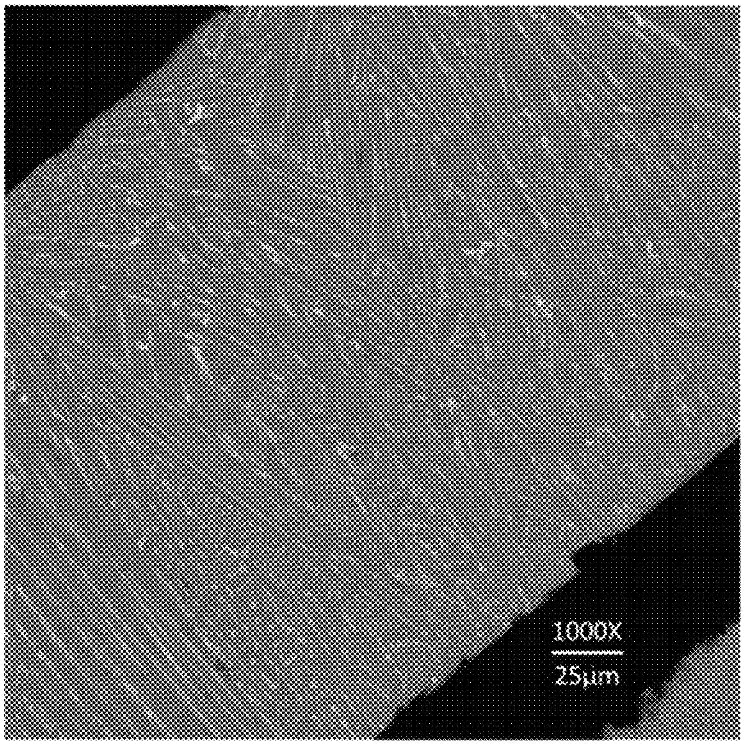
FIG. 18 is a scanning electron microscope (SEM) photograph (1000-fold magnification) of alloy cast strip of Comparative Example 3.

The formulation components and the casting process of Comparative Example 2 and Comparative Example 3 were the same as those of Example 2 and Example 3, respectively, wherein the casting temperature of Comparative Example 2 is 1380° C. Cooling is carried out using the rotary cooling roll of the present disclosure. In Comparative Example 3, casting temperature is 1492° C. It is cooled by a conventional rotary cooling roller. Further, in the smelting processes of Comparative Example 2 and Comparative Example 3, the cyclic overheat treatment is not performed, and the melt temperature gradually increased from low to high during the smelting process. During the casting process, the melt has a degree of subcooling of 200 to 300° C. Among them, the melt supercooling degree in the casting process of Comparative Example 2 is 300° C., which is higher than the subcooling degree of the melt of 245° C. in Comparative Example 3, indicating that the cooling capacity of the rotary cooling roll shown in FIG. 7*a* is larger than that of the conventional cooling roll. However, compared to Example 2, it is lower than the subcooling degree of 365° C. in Example 2, which may be due to the fact that the melt of Example 2 is subjected to the cyclic overheat treatment, resulting in the melt being able to withstand a greater degree of subcooling. Since the melt once solidified, the heat exchange efficiency of the solid alloy to the surface of the cooling roll will be lower than the heat exchange efficiency between the melt and the cooling roll, resulting in a high surface temperature of the solid alloy cast strip. The microstructure of the alloy cast strip is similar to that of Comparative Example 1, and there is no essential difference, and the rare-earth-rich phase is radial, as shown in FIGS. 17 and 18. The polarized photomicrograph shows a grain morphology very similar to that of FIG. 2, consistent with the conventional alloy cast structure strip. The properties of the alloy cast strips prepared and the sintered magnets finally prepared in Comparative Example 2 and Comparative Example 3 can be seen in Tables 5 and 6.

TABLE 5

Comparison of alloy cast strips in Example 2 and 3 with those in Comparative Examples 2 and 3

| | l/d∈ [0.3, 2] grain ratio | l/d > 3 Grain % | r∈ [10, 50] grain area ratio | r∈ [15, 45] grain number ratio | m | $L_1$(μm) | $L_2$(μm) |
|---|---|---|---|---|---|---|---|
| Example 2 | Area: 63%<br>Number: 77.5% | Area: 12%<br>Number: 7.6% | 87.5% | 71% | 0.2% | 1.5-2.8: | 0.8-1.8: |
| Comparative Example 2 | Area: 11%<br>Number: 21.5% | Area: 63%<br>Number: 43% | 29% | 33% | 100% | 2.5-8: | 1-2.2: |
| Example 3 | Area: 60%<br>Number: 75% | Area: 11.5%<br>Number: 8% | 89.2% | 77% | 5% | 2-3.5: | 0.8-2: |
| Comparative Example 3 | Area: 20.3%<br>Number: 29% | Area: 56%<br>Number: 39% | 37.5% | 34% | 98% | 3-12: | 1.8-2.6: |

TABLE 6

Test data of particle size and magnet properties of the powders prepared in Examples 2 and 3 and Comparative Examples 2 and 3.

| | Prepare powder by jet mill | | | TRE | $B_r$ | $H_{cJ}$ | $(BH)_{Max}$ |
|---|---|---|---|---|---|---|---|
| | $D_{10}$ | $D_{50}$ | $D_{90}$ | (wt. %) | (kGs) | (kOe) | (MGOe) |
| Example 2 | 1.53 | 4.41 | 8.21 | 30.0 | 13.05 | 18.75 | 42.25 |
| Example 2 | | | | 30.0 | 13.03 | 18.71 | 42.23 |
| Example 2 | | | | 29.9 | 13.3 | 18.72 | 42.77 |
| Comparative Example 2 | 1.61 | 4.65 | 8.44 | 29.9 | 13.02 | 18.69 | 42.18 |
| Comparative Example 2 | | | | 29.9 | 13.01 | 18.73 | 42.19 |
| Comparative Example 2 | | | | 29.7 | 13.05 | 18.65 | 42.23 |
| Example 3 | 1.58 | 4.51 | 8.33 | 34.2 | 12.93 | 21.19 | 41.80 |
| Example 3 | | | | 33.9 | 12.95 | 20.37 | 41.86 |
| Example 3 | | | | 33.9 | 12.96 | 21.90 | 41.86 |
| Comparative Example 3 | 1.62 | 4.71 | 8.51 | 33.6 | 12.97 | 21.07 | 41.79 |
| Comparative Example 3 | | | | 33.6 | 12.99 | 20.79 | 41.83 |
| Comparative Example 3 | | | | 32.9 | 12.93 | 20.86 | 41.76 |

TABLE 7

Aspect ratio and equivalent circle diameter of the alloy cast strip shown in FIG. 16

| Grain number | Aspect ratio l/d | Equivalent circle diameter r/μm |
|---|---|---|
| 1 | 2.239 | 50.291 |
| 2 | 0.750 | 6.705 |
| 3 | 0.676 | 30.494 |
| 4 | 1.526 | 25.956 |
| 5 | 2.119 | 30.772 |
| 6 | 1.743 | 60.290 |
| 7 | 2.471 | 33.636 |
| 8 | 3.181 | 50.641 |
| 9 | 3.108 | 32.936 |
| 10 | 1.917 | 38.297 |
| 12 | 2.793 | 39.613 |
| 13 | 1.315 | 42.652 |
| 14 | 2.434 | 38.419 |
| 15 | 1.253 | 19.829 |
| 16 | 2.323 | 33.443 |
| 17 | 3.652 | 27.665 |
| 18 | 2.442 | 35.342 |
| 19 | 1.784 | 31.890 |
| 21 | 2.605 | 11.497 |
| 22 | 2.575 | 31.446 |
| 23 | 1.387 | 24.386 |
| 24 | 3.246 | 14.825 |
| 25 | 3.091 | 45.456 |

TABLE 7-continued

Aspect ratio and equivalent circle diameter of the alloy cast strip shown in FIG. 16

| Grain number | Aspect ratio l/d | Equivalent circle diameter r/μm |
|---|---|---|
| 26 | 1.175 | 48.544 |
| 27 | 1.537 | 22.038 |
| 28 | 3.483 | 48.936 |
| 29 | 1.568 | 29.639 |
| 30 | 0.545 | 34.729 |
| 31 | 1.953 | 34.250 |
| 32 | 1.144 | 27.165 |
| 33 | 1.667 | 39.857 |
| 34 | 1.562 | 35.201 |
| 35 | 1.106 | 33.935 |
| 36 | 1.272 | 29.640 |
| 37 | 1.550 | 26.747 |
| 38 | 2.006 | 40.601 |
| 39 | 1.032 | 10.834 |
| 40 | 1.727 | 26.744 |
| 41 | 1.580 | 29.005 |
| 42 | 1.884 | 33.254 |
| 43 | 1.053 | 34.506 |
| 46 | 1.000 | 31.515 |
| 47 | 1.409 | 11.266 |
| 49 | 1.533 | 22.050 |

TABLE 7-continued

| Aspect ratio and equivalent circle diameter of the alloy cast strip shown in FIG. 16 | | |
|---|---|---|
| Grain number | Aspect ratio l/d | Equivalent circle diameter r/μm |
| 50 | 2.238 | 19.288 |
| 51 | 1.537 | 35.051 |
| 52 | 1.010 | 22.668 |
| 53 | 1.673 | 19.901 |
| 54 | 1.800 | 17.298 |
| 55 | 1.338 | 16.756 |
| 56 | 1.30 | 26.115 |
| 57 | 1.97 | 31.451 |
| 59 | 2.44 | 14.505 |
| 60 | 2.21 | 21.891 |
| 61 | 1.21 | 17.501 |
| 62 | 1.68 | 18.635 |
| 63 | 0.85 | 15.366 |
| 64 | 0.98 | 8.093 |
| 65 | 1.21 | 18.375 |
| 66 | 1.39 | 13.458 |
| 67 | 0.83 | 12.869 |
| 68 | 0.91 | 27.153 |
| 69 | 0.56 | 8.916 |
| 70 | 0.52 | 26.448 |
| 71 | 0.97 | 18.995 |
| 72 | 0.70 | 21.637 |
| 73 | 0.95 | 12.927 |
| 74 | 0.69 | 19.953 |
| 75 | 1.36 | 5.155 |
| 76 | 1.00 | 9.974 |
| 77 | 1.03 | 13.207 |
| 78 | 0.96 | 12.435 |
| 80 | 0.56 | 13.458 |

Example 4-6 and Comparative Example 4-6

In Examples 4-6 and Comparative Examples 4-6, alloy cast strips with plural formulation were prepared using a 5 kg induction melting furnace. In the preparation process, Examples 4-6 are similar to Example 1 except for the casting temperature, and Comparative Examples 4-6 were similar to Comparative Example 1, and the microstructure of the alloy cast sheets is similar to that of Example 1 and Comparative Example 1, respectively. The specific alloy formula is as follows:

The alloy formulation of Example 4 and Comparative Example 4 is $Nd_{20.88}Pr_{6.5}Dy_{5.68}Co_{0.92}Cu_{0.13}Ga_{0.5}Al_{0.22}B_{0.85}Fe_{Bal}$. The casting temperature is 1400° C. The alloy formulation of Example 5 and Comparative Example 5 is $Nd_{29}Fe_{70}B$, the casting temperatures were 1450° C. and 1285° C., respectively. The alloy formulation of Example 6 and Comparative Example 6 is $Nd_{25.3}Pr_{4.9}B1.1Co_{0.32}Nb_{0.12}Al_{0.13}Cu_{0.18}Ga_{0.14}Fe_{Bal}$. The casting temperature is 1400° C.

The obtained alloy cast strip is subjected to the same powdering and heat treatment process as in Example 1 to prepare a magnet. The total mass of the rare earth in the magnet obtained from the alloy cast strip of Example 4-6 is usually 0.1% to 0.3% more than that of the corresponding comparative example, and the coercive force is high, as shown in Table 8.

TABLE 8

Test data of particle size and magnet properties of the powders prepared in Examples 4-6 and Comparative Examples 4-6

| | Prepare powder by jet mill | | | TRE | $B_r$ | $H_{cJ}$ | $(BH)_{Max}$ |
|---|---|---|---|---|---|---|---|
| | $D_{10}$ | $D_{50}$ | $D_{90}$ | (wt. %) | (kGs) | (kOe) | (MGOe) |
| Example 4 | 1.50 | 4.42 | 8.23 | 32.0 | 12.01 | 31.20 | 38.90 |
| Example 4 | | | | 32.2 | 11.93 | 32.14 | 38.68 |
| Example 4 | | | | 32.1 | 12.00 | 31.28 | 38.87 |
| Comparative Example 4 | 1.57 | 4.61 | 8.39 | 29.9 | 12.07 | 30.54 | 39.04 |
| Comparative Example 4 | | | | 29.9 | 12.10 | 30.23 | 39.20 |
| Comparative Example 4 | | | | 29.7 | 12.11 | 30.03 | 39.23 |
| Example 5 | 1.51 | 4.41 | 8.21 | 28.01 | 14.58 | 8.17 | 48.03 |
| Example 5 | | | | 27.99 | 14.57 | 8.13 | 47.95 |
| Example 5 | | | | 28.00 | 14.59 | 8.21 | 48.05 |
| Comparative Example 5 | 1.62 | 4.72 | 8.49 | 27.99 | 14.53 | 7.95 | 47.95 |
| Comparative Example 5 | | | | 27.97 | 14.58 | 7.81 | 48.09 |
| Comparative Example 5 | | | | 27.97 | 14.58 | 7.79 | 48.13 |
| Example 6 | 1.48 | 4.39 | 8.19 | 29.0 | 13.98 | 11.32 | 45.99 |
| Example 6 | | | | 28.8 | 13.98 | 11.28 | 45.97 |
| Example 6 | | | | 29.0 | 13.97 | 11.35 | 45.93 |
| Comparative Example 6 | 1.58 | 4.61 | 8.35 | 28.6 | 13.98 | 11.23 | 45.98 |
| Comparative Example 6 | | | | 28.6 | 13.97 | 11.16 | 45.98 |
| Comparative Example 6 | | | | 28.5 | 14.00 | 11.13 | 45.95 |

Figure 20:
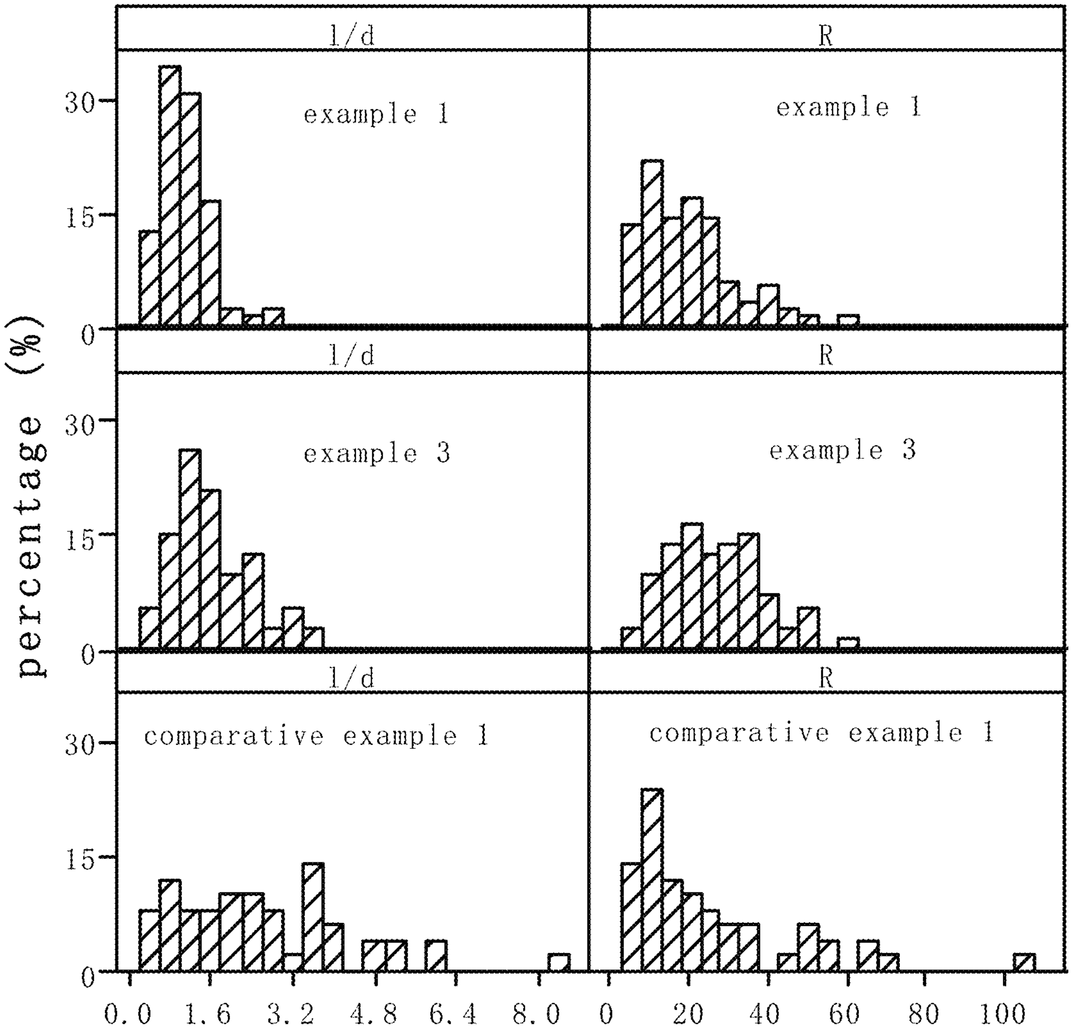
FIG. 20 is a histogram showing the distribution of the number of grains with the aspect ratio and the equivalent circle diameter of the alloy cast strips prepared in Example 1, Example 3, and Comparative Example 1.
Figure 21:
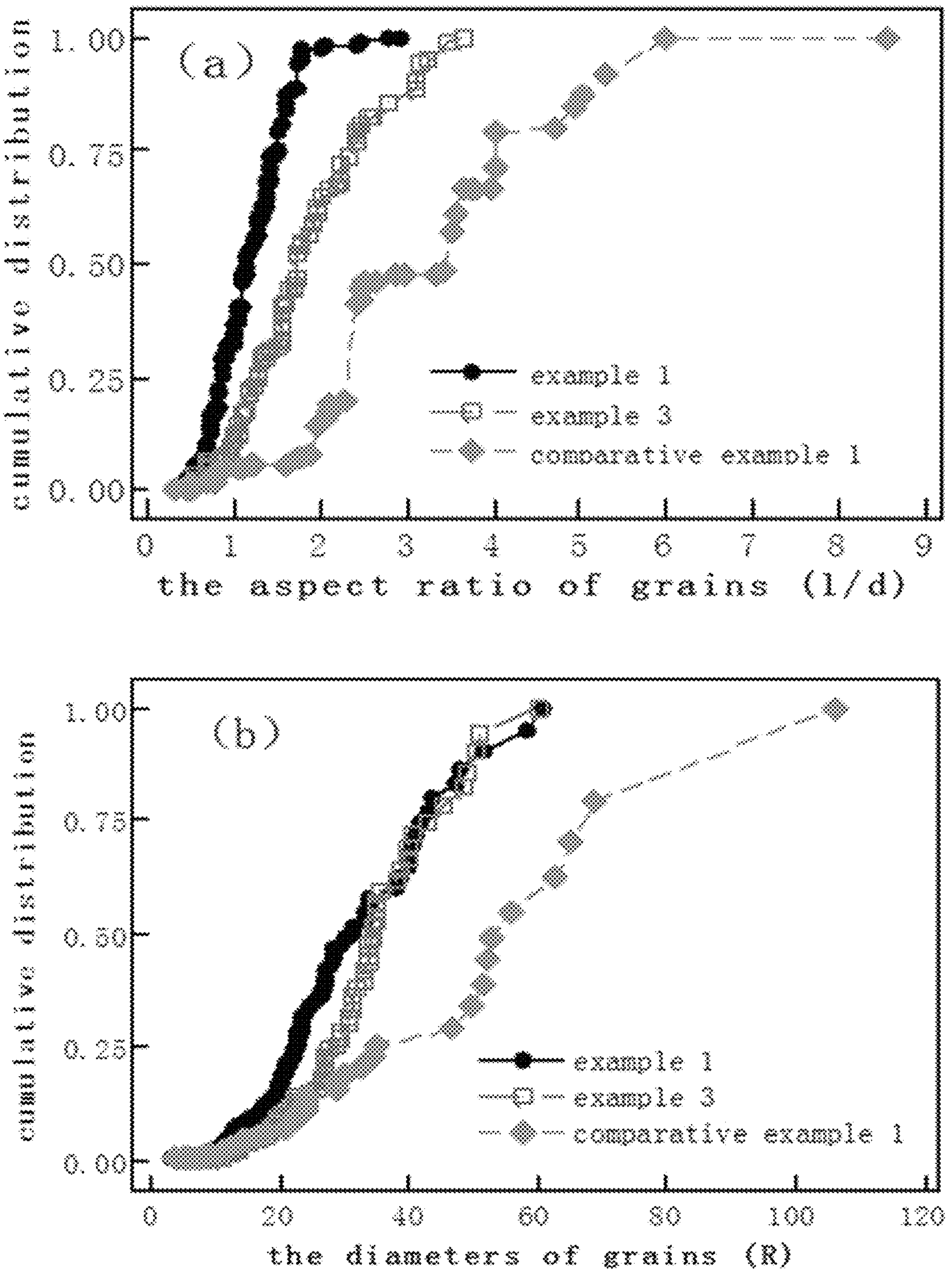
FIG. 21 is a graph showing the cumulative distribution of the grain area with the aspect ratio of the crystal grains and the equivalent circle diameter of the alloy cast strips prepared in Example 1, Example 3, and Comparative Example 1.

In order to compare the present disclosure with the conventional alloy cast strip more clearly and concisely, in the present disclosure, the data of Table 1, Table 4 and Table 7 are selected as representative, and the feature comparison data is obtained after conversion, as shown in FIG. 20 and FIG. 21.

As shown in FIG. 20, in the embodiment, l/d is mainly concentrated in 0.3 to 2, and the number of more than 3 is extremely few. In the comparative example, the aspect ratio of the crystal grains is 0.3 to 6, and some is up to 8, and the distribution is relatively dispersed. Further, in the examples, r is mostly concentrated in 6 to 45, and in the comparative example, r is mostly 2 to 25. The r of a few large grains can reach more than 100 μm. That is, in the examples, fine crystal grains and large crystal grains are relatively less in comparison, and l/d is concentrated in the vicinity of 1. It is shown that the grains are more uniform in the examples, and the medium-sized equiaxed grains are mostly.

FIG. 21(*a*) shows the cumulative distribution of grain area with l/d. From the figure, the rise trend when the example curve is at l/d<2 is significantly larger than that of the comparative example. That is, the medium-axis crystal in the example occupies are dominant, and the grains of l/d>4 are extremely few. In the comparative example, the rise is slow when l/d<2. That is, the columnar grain is a main grain form in the comparative example. FIG. 21(*b*) shows the cumulative distribution of grain area with r. The curve of the comparative example has a slow rising trend, and the grain r is distributed at 40 to 100 μm. In the embodiment, the grains r rise steeply in the range of 15 to 50 μm, that is, a large number of grains are concentrated in this range. Comparing FIG. 20 with FIG. 21, it is understood that the medium-axis crystal of the alloy cast strip of the example is a main crystal form, and the average grain size is finer and uniform than the comparative example, and the grain size is medium. This microstructural feature is derived from the higher nucleation rate caused by the higher degree of supercooling in the examples, and also determines the smaller spacing of the rare-earth-rich phase inside the grain. From this point of view, the refinement of the rare-earth-rich phase inevitably brings about the grain refinement.

Compared to conventional alloy casts, when the jet mill powder size $D_{50}$ is closer to or slightly larger than spacing of the rare-earth-rich phase, the final magnet grain size will be smaller. The advantageous the performance of the magnet prepared by the alloy cast sheet in the present disclosure will be more obvious. However, the magnets prepared in the examples of the present disclosure are limited by the jet milling and sintering process, and the average grain size of the powder and the final magnet is large, and the performance of the magnet is slightly improved even under such conditions. It is foreseen that the improvement of the performance of the final magnet of the alloy cast strip by the present disclosure will be more apparent with the optimization of the final sintering magnet grain refining process, and is not limited to the improvement effect in the embodiment of the present disclosure.

It should be noted that the above-described embodiments are merely illustrative of the disclosure and are not intended to limit the disclosure. Other variations or modifications may be made by those skilled in the art in light of the above description. There is no need and no way to exhaust all of the implementations. Obvious changes or variations resulting therefrom are still within the scope of the disclosure.

What is claimed is:

1. An alloy cast strip preparation method comprising:

performing a melting process including:

placing rust-removed alloy raw material in a crucible placed in an induction melting furnace;

excluding impurity gas adsorbed by the alloy raw material;

controlling a power of the induction melting furnace to perform a cyclic heat treatment to completely melt the alloy raw material before a surface temperature of a melt obtained by melting the alloy raw material is raised to 1300° C.;

after the alloy raw material is melted, adjusting the power of the induction melting furnace to stabilize the surface temperature of the melt at a temperature in a range from 1400° C. to 1500° C.; and performing a casting cooling process including:

arranging the melt uniformly and smoothly on a surface of a rotary cooling roll; and performing casting cooling on the melt to obtain an alloy cast strip, while controlling a surface linear velocity of the rotary cooling roll to be from 1.5 m/s to 2.25 m/s;

wherein:

main components of the alloy cast strip include a rare earth R, an additive element T, iron Fe, and boron B;

R is one or more of La, Ce, Pr, Nd, Sm, Tb, Dy, Ho, Sc, and Y;

T is one or more of Co, Ni, Cu, Mn, Cr, Ga, V, Ti, Al, Zr, Nb, and Sn; and a mass ratio of R in the alloy cast strip is in a range from 29% to 35%, a mass ratio of T in the alloy cast strip is smaller than or equal to 5%, and a mass ratio of B in the alloy cast strip is in a range from 0.85% to 1.1%.

2. The method according to claim 1, wherein, during the casting cooling process, a ratio of a melt casting speed to a water flow rate is controlled to be in a range from 0.05 to 0.1, the melt casting speed being a weight of the melt being cast divided by a casting time.

3. The method according to claim 1, wherein, during the casting cooling process, a difference between an average temperature of the alloy cast strip on a highest point of the rotary cooling roll and a melting point of a main phase of the alloy cast strip ranges from 300° C. to 450° C.

* * * * *